US010616901B2

(12) United States Patent
Cho et al.

(10) Patent No.: US 10,616,901 B2
(45) Date of Patent: Apr. 7, 2020

(54) METHOD OF CONFIGURING BEARER FOR SENDING AND RECEIVING DATA IN WIRELESS COMMUNICATION SYSTEM AND APPARATUS SUPPORTING THE METHOD

(71) Applicant: LG ELECTRONICS INC., Seoul (KR)

(72) Inventors: Heejeong Cho, Seoul (KR); Genebeck Hahn, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 15/572,963

(22) PCT Filed: Feb. 3, 2016

(86) PCT No.: PCT/KR2016/001173
§ 371 (c)(1),
(2) Date: Nov. 9, 2017

(87) PCT Pub. No.: WO2016/182168
PCT Pub. Date: Nov. 17, 2016

(65) Prior Publication Data
US 2018/0139762 A1    May 17, 2018

Related U.S. Application Data

(60) Provisional application No. 62/161,237, filed on May 13, 2015.

(51) Int. Cl.
*H04W 72/08* (2009.01)
*H04W 4/90* (2018.01)
(Continued)

(52) U.S. Cl.
CPC ........... *H04W 72/085* (2013.01); *H04W 4/90* (2018.02); *H04W 72/0413* (2013.01);
(Continued)

(58) Field of Classification Search
CPC ........................... H04W 72/085; H04W 76/15
(Continued)

(56) References Cited

U.S. PATENT DOCUMENTS

2007/0091713 A1\* 4/2007 Wang ................. A61B 1/00036
365/233.12
2008/0153454 A1   6/2008 Haapapuro et al.
(Continued)

FOREIGN PATENT DOCUMENTS

GB           2509072 A       6/2014
WO    WO 2008/074782 A1    6/2008
WO    WO 2010/098146 A1    9/2010

OTHER PUBLICATIONS

3GPP, "3rd Generation Partnership Project", Technical Specification Group Core Network and Terminals, Non-Access-Stratum (NAS) protocol for Evolved Packet System(EPS), Stage 3(Release 13), 3GPP TS 24.301, V13.1.0, Mar. 2015, pp. 1-155.

*Primary Examiner* — Peter G Solinsky
(74) *Attorney, Agent, or Firm* — Birch, Stewart, Kolasch & Birch, LLP

(57) ABSTRACT

The present invention relates to a method and apparatus for establishing a plurality of bearers for transmitting and receiving data in a wireless communication system. In accordance with an embodiment of the present invention, there is provided a method of establishing, by a base station, a plurality of bearers including establishing the plurality of bearers between a plurality of network nodes and the base station, receiving a specific message through a dedicated bearer from a user equipment, the specific message including message type information indicating a type of the
(Continued)

specific message, and transmitting the specific message to one of the plurality of network nodes through one of the plurality of bearers based on the message type information.

18 Claims, 32 Drawing Sheets

(51) Int. Cl.
*H04W 76/50* (2018.01)
*H04W 76/15* (2018.01)
*H04W 72/04* (2009.01)
*H04W 72/12* (2009.01)
*H04W 48/12* (2009.01)
*H04W 28/02* (2009.01)

(52) U.S. Cl.
CPC ....... *H04W 72/1284* (2013.01); *H04W 76/15* (2018.02); *H04W 76/50* (2018.02); *H04W 28/0252* (2013.01); *H04W 48/12* (2013.01)

(58) Field of Classification Search
USPC ......................................................... 370/329
See application file for complete search history.

(56) References Cited

U.S. PATENT DOCUMENTS

| | | | |
|---|---|---|---|
| 2009/0252132 A1* | 10/2009 | Song | H04W 76/15 370/338 |
| 2009/0290493 A1* | 11/2009 | Xu | H04W 28/08 370/237 |
| 2013/0021965 A1 | 1/2013 | Chu et al. | |
| 2013/0058220 A1* | 3/2013 | Yi | H04W 72/1284 370/241 |
| 2013/0107863 A1* | 5/2013 | Faccin | H04W 36/0022 370/331 |
| 2013/0281048 A1 | 10/2013 | Hietalahti et al. | |
| 2014/0162676 A1 | 6/2014 | Shaw | |
| 2016/0150564 A1* | 5/2016 | Quan | H04L 61/6054 370/329 |
| 2016/0232037 A1* | 8/2016 | Depner | G06F 9/5016 |
| 2016/0234715 A1* | 8/2016 | Futaki | H04W 48/06 |
| 2019/0098133 A1* | 3/2019 | Poikselka | H04L 65/1016 |
| 2019/0132903 A1* | 5/2019 | Suxena | H04W 76/50 |

* cited by examiner

[Fig. 1]
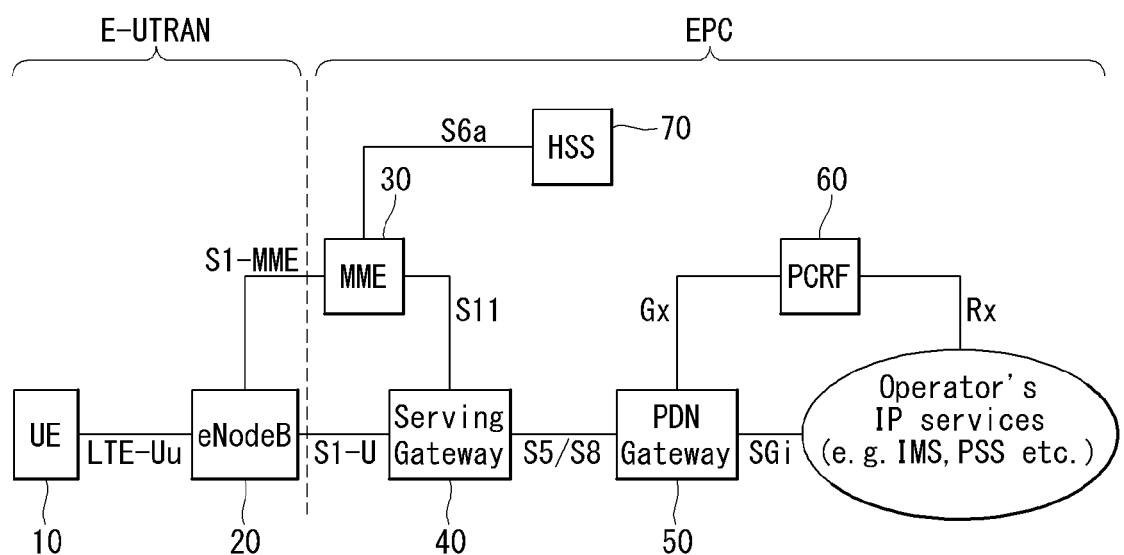

[Fig. 2]
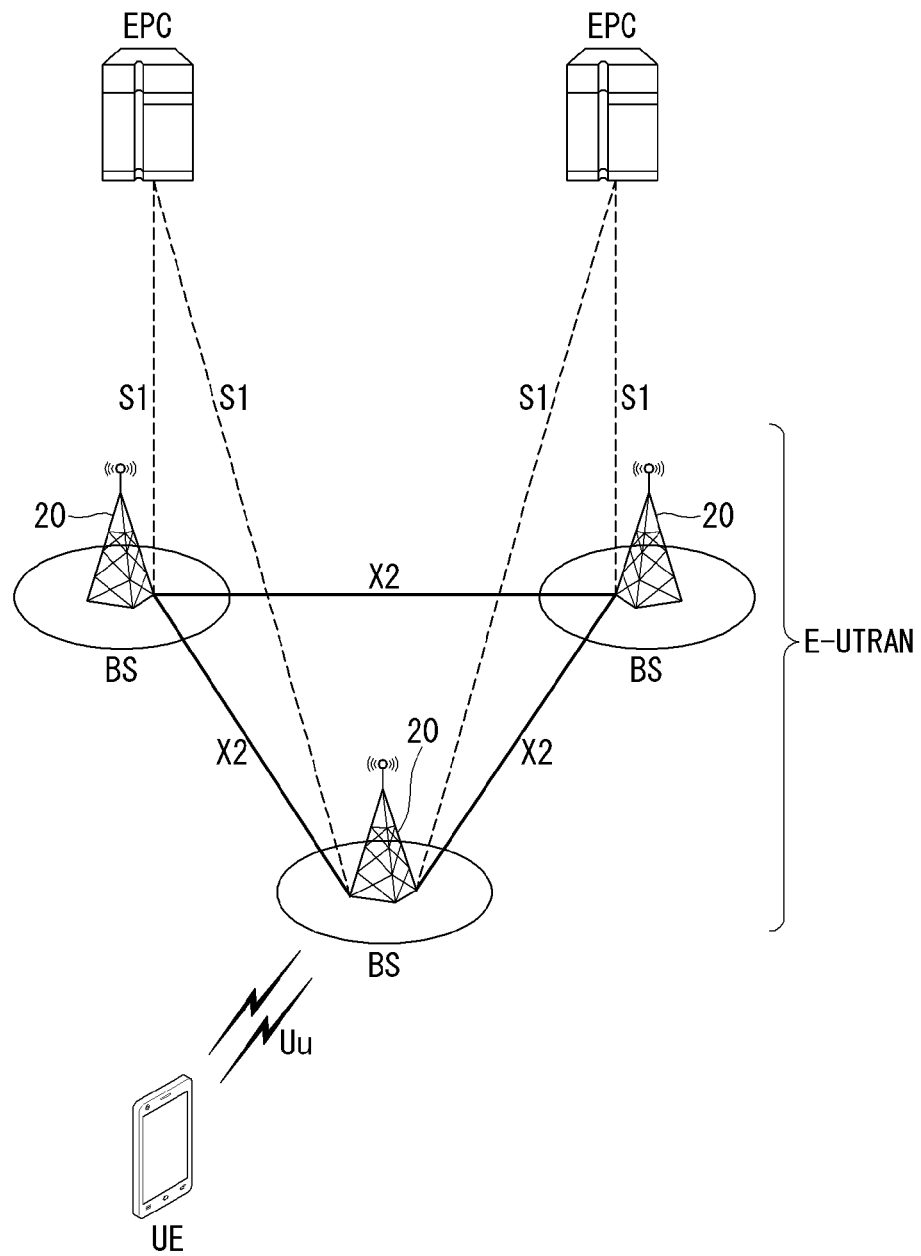

[Fig. 3]
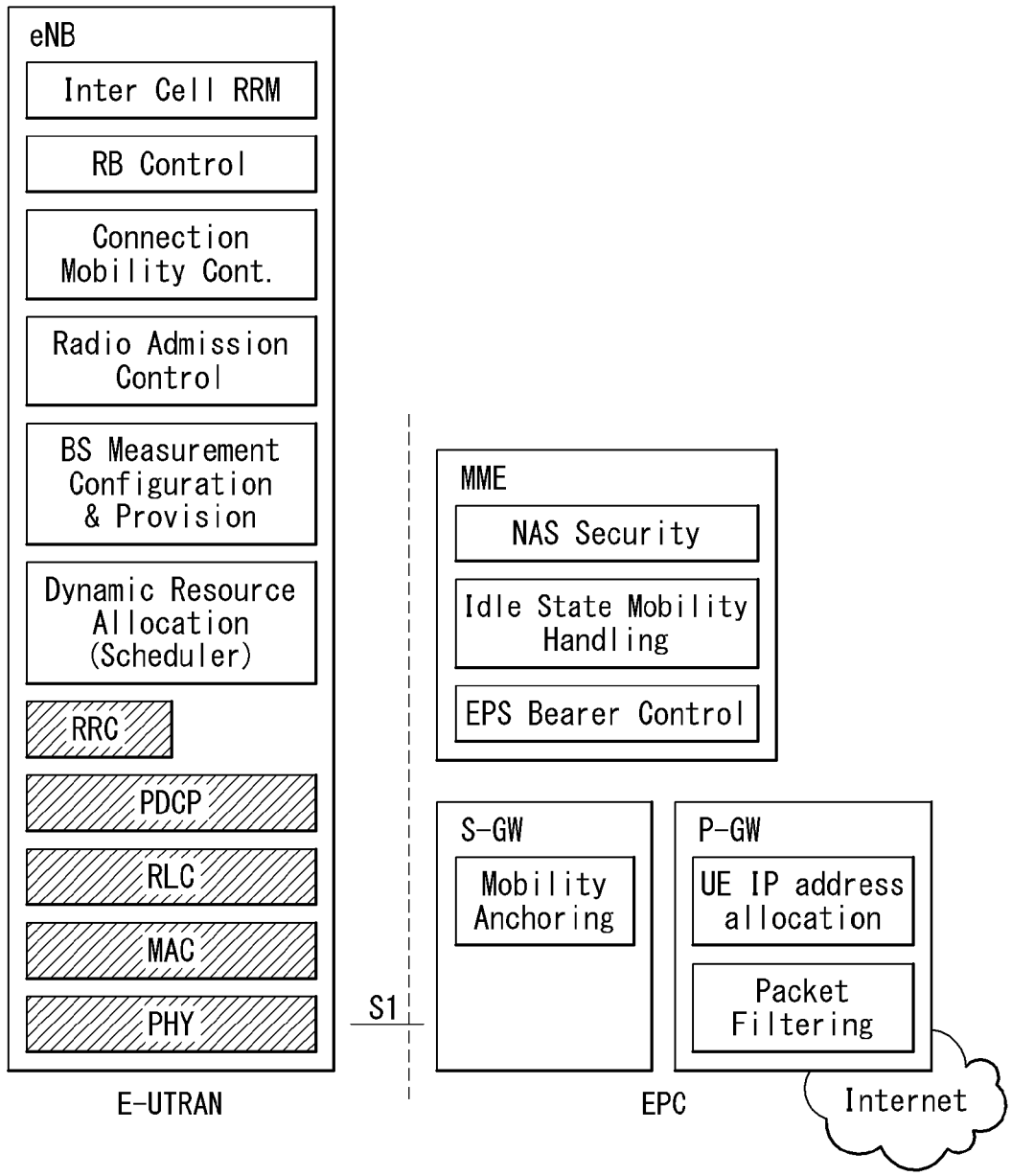

[Fig. 4]
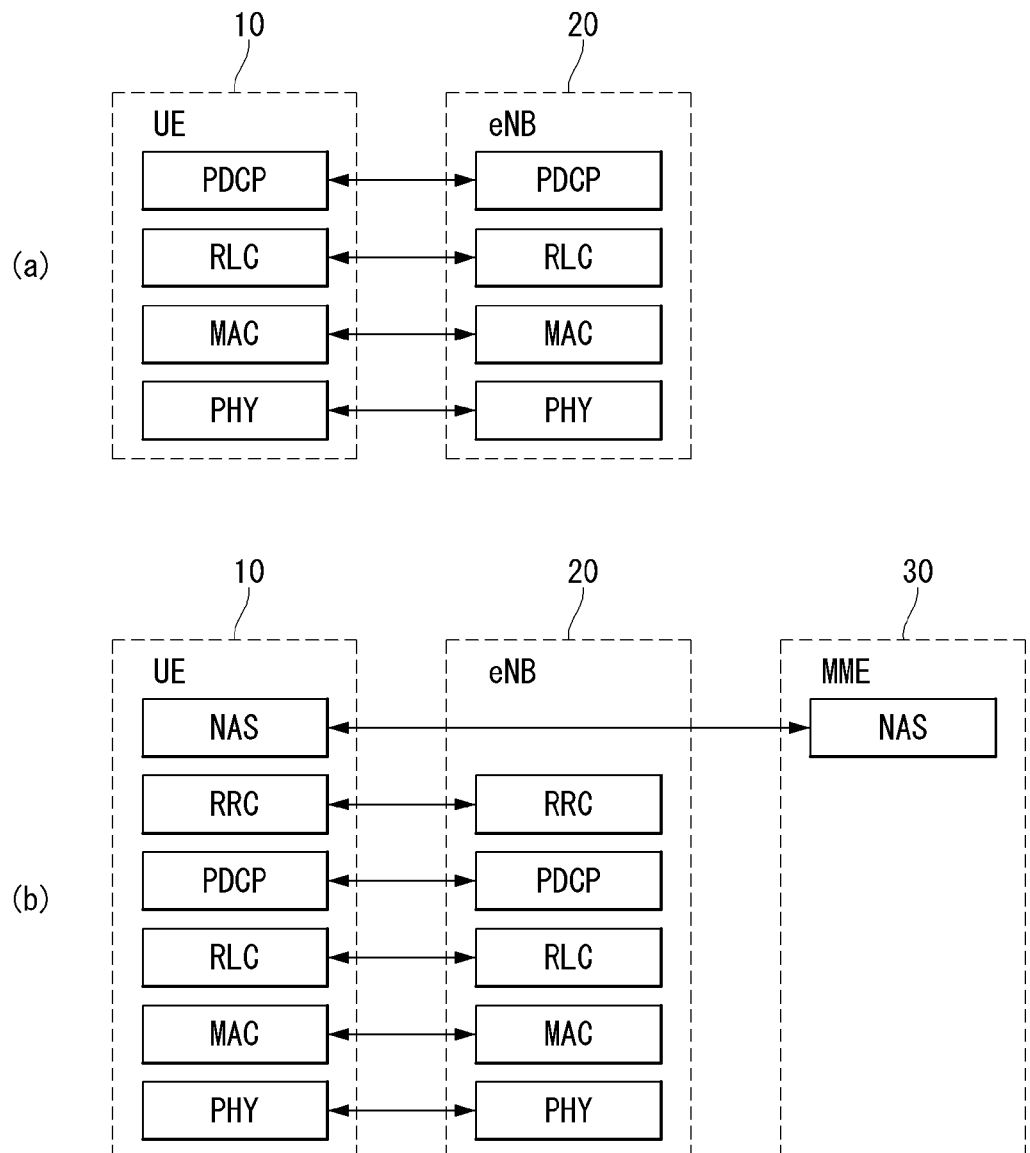

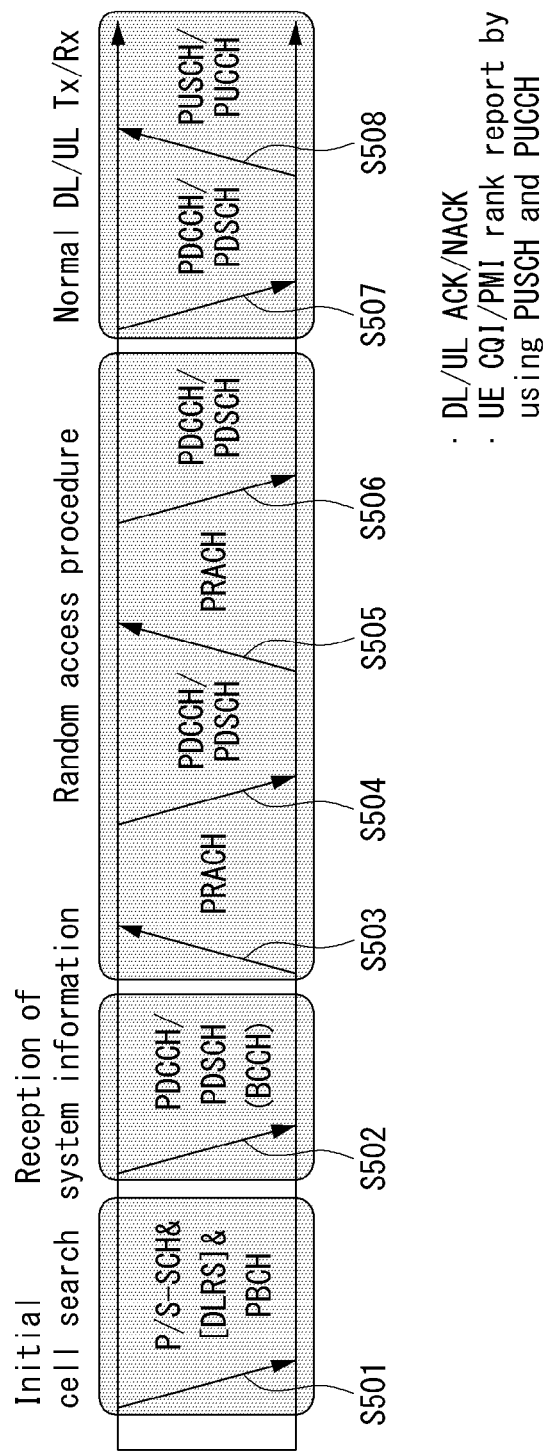
[Fig. 5]

[Fig. 6]
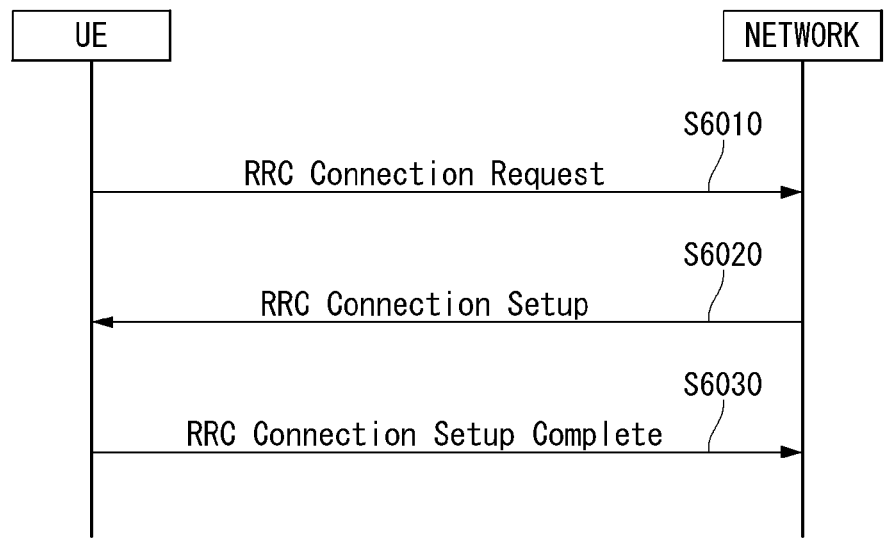
[Fig. 7]
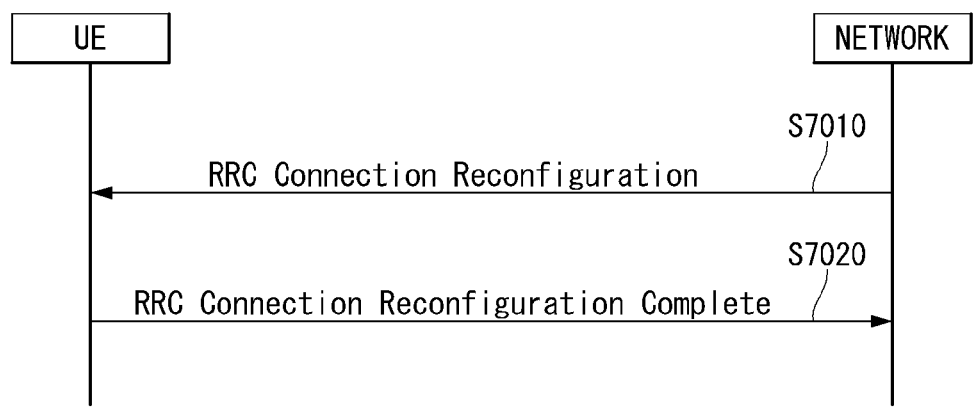

[Fig. 8]
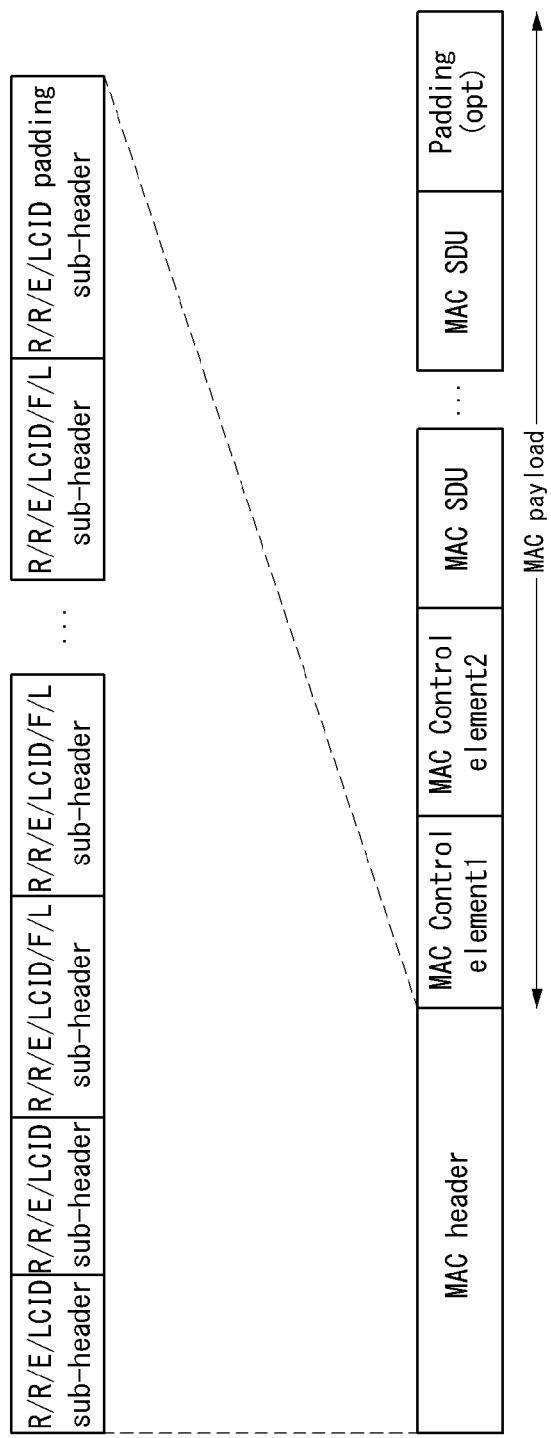

[Fig. 9]
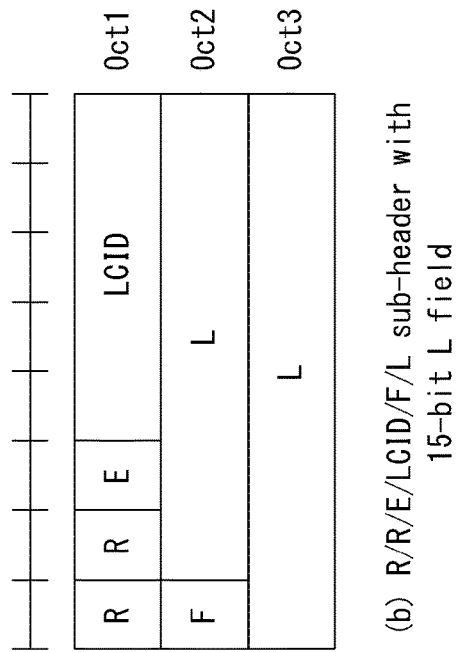
[Fig. 10]
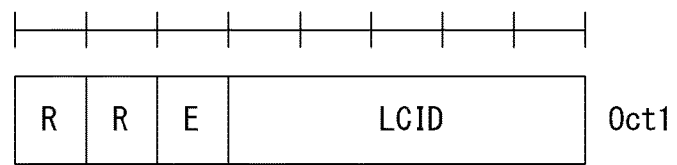
R/R/E/LCID sub-header

[Fig. 11]
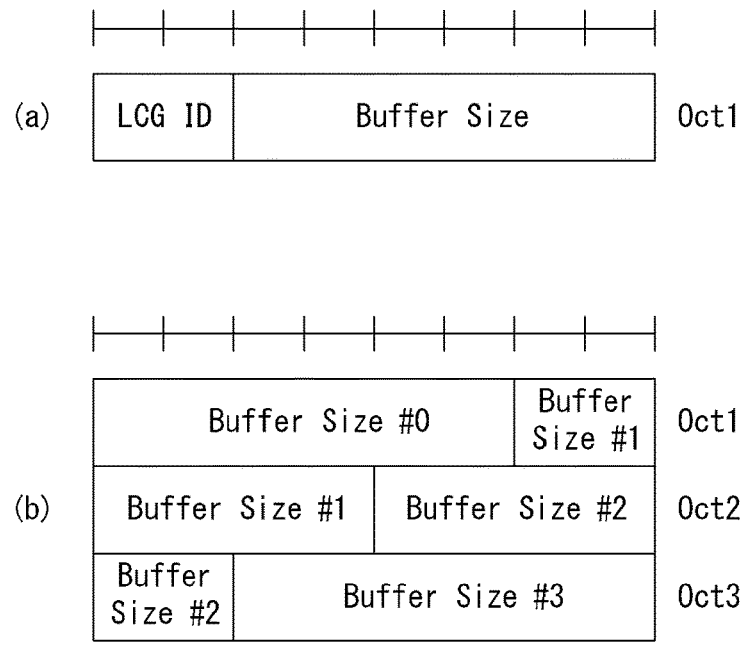
[Fig. 12]
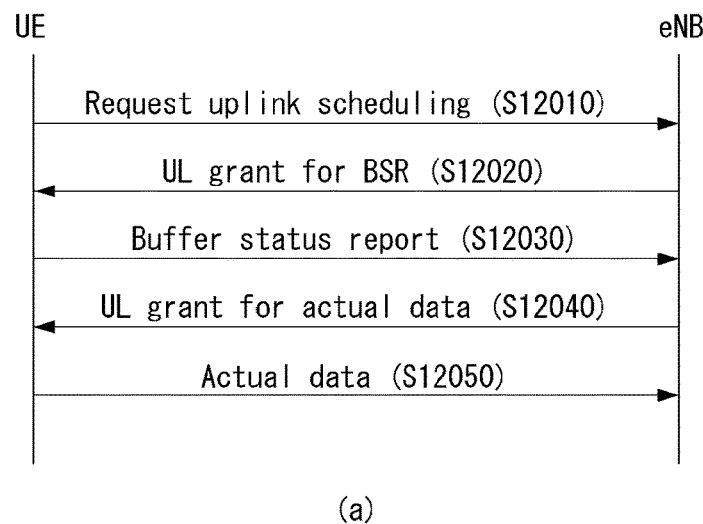
(a)
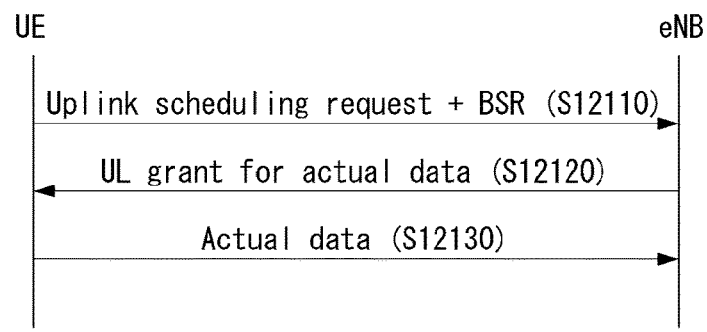
(b)

[Fig. 13]
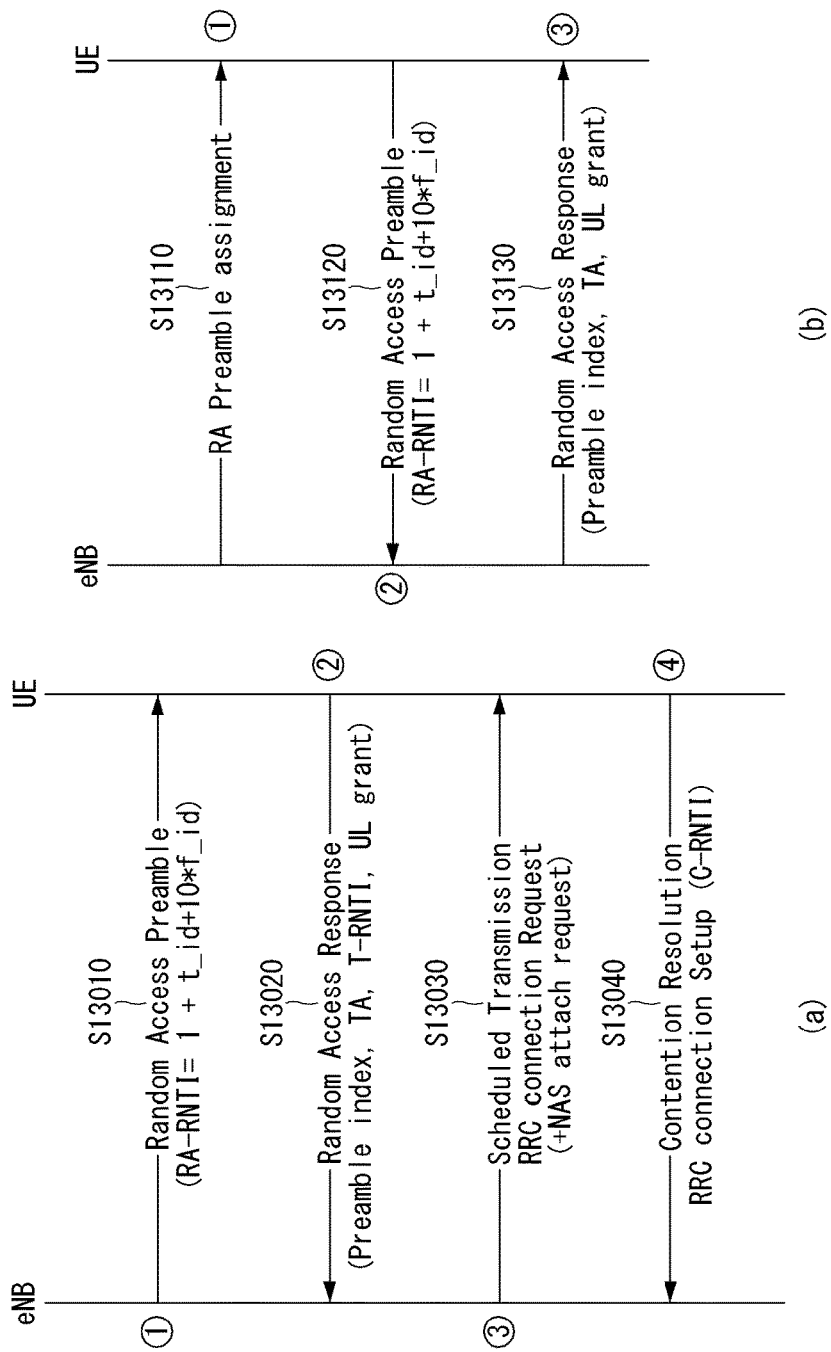
[Fig. 14]
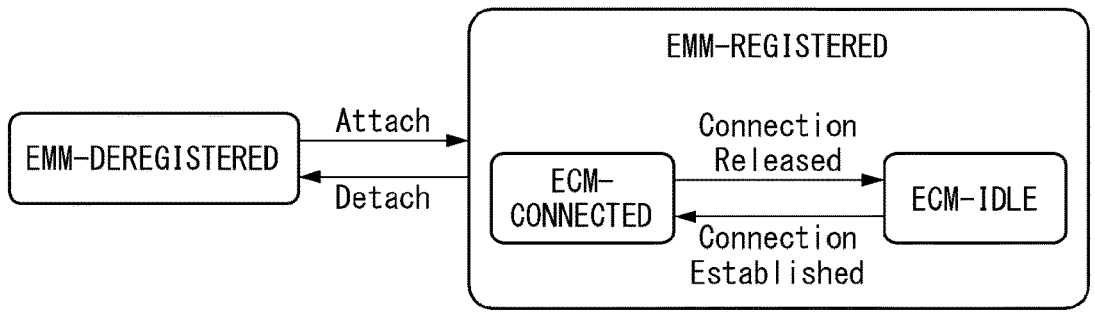

[Fig. 15]
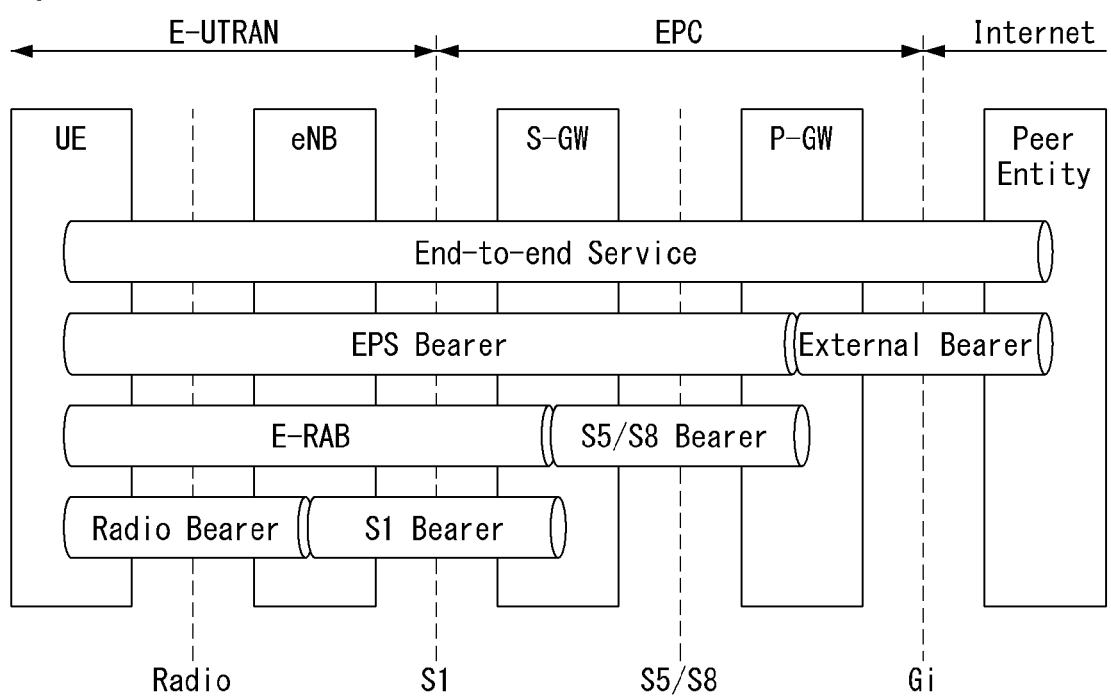

[Fig. 16]
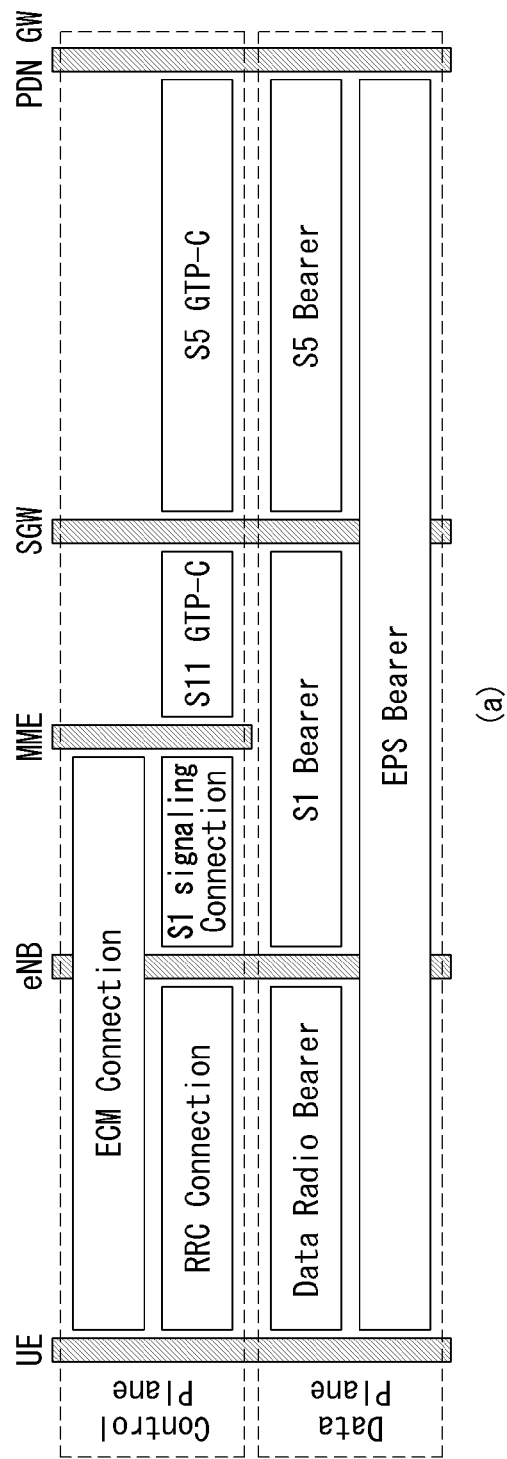
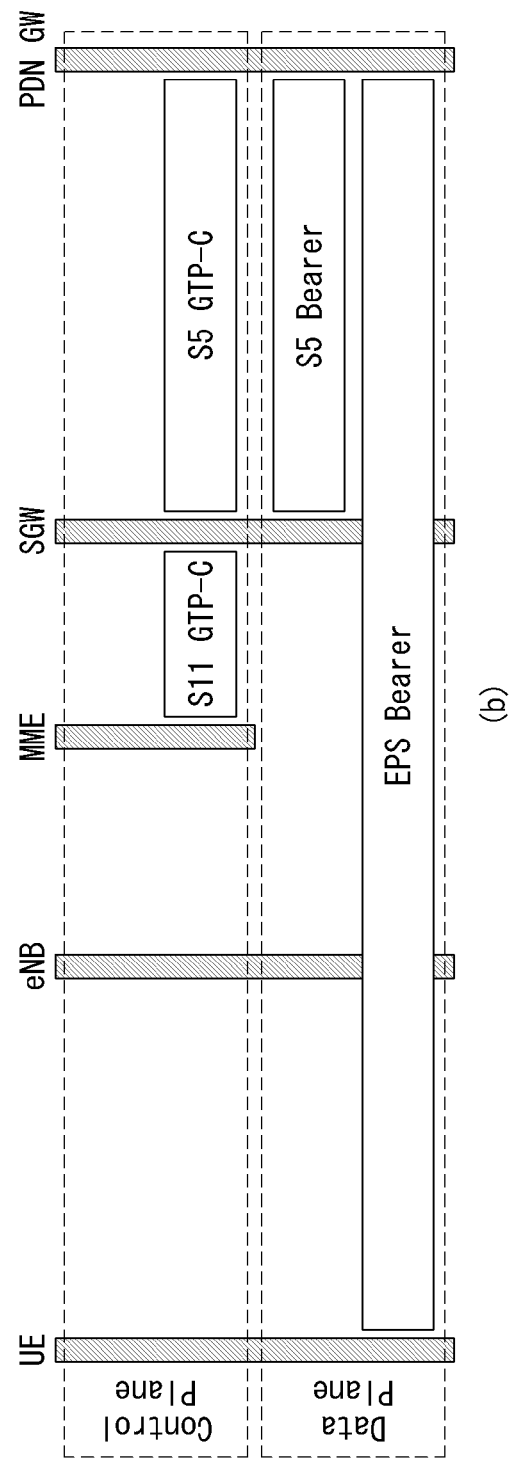

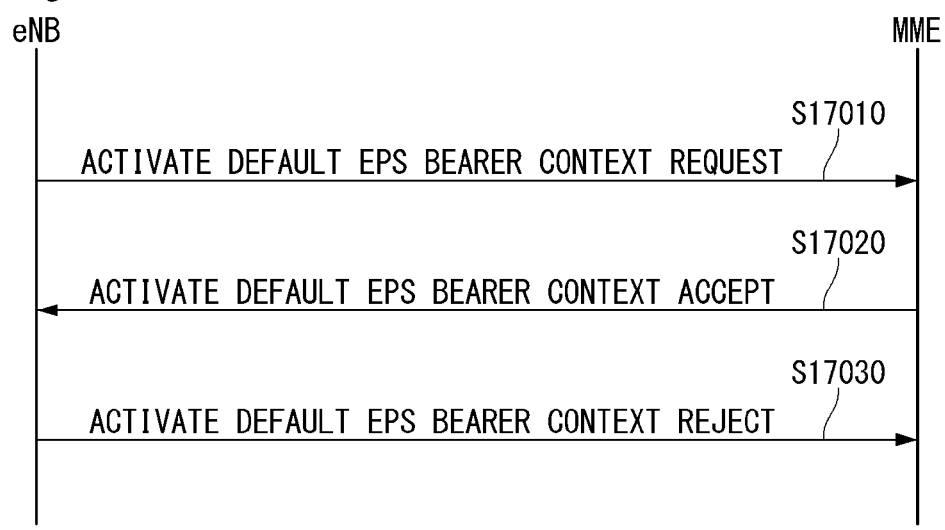
[Fig. 17]

[Fig. 18]
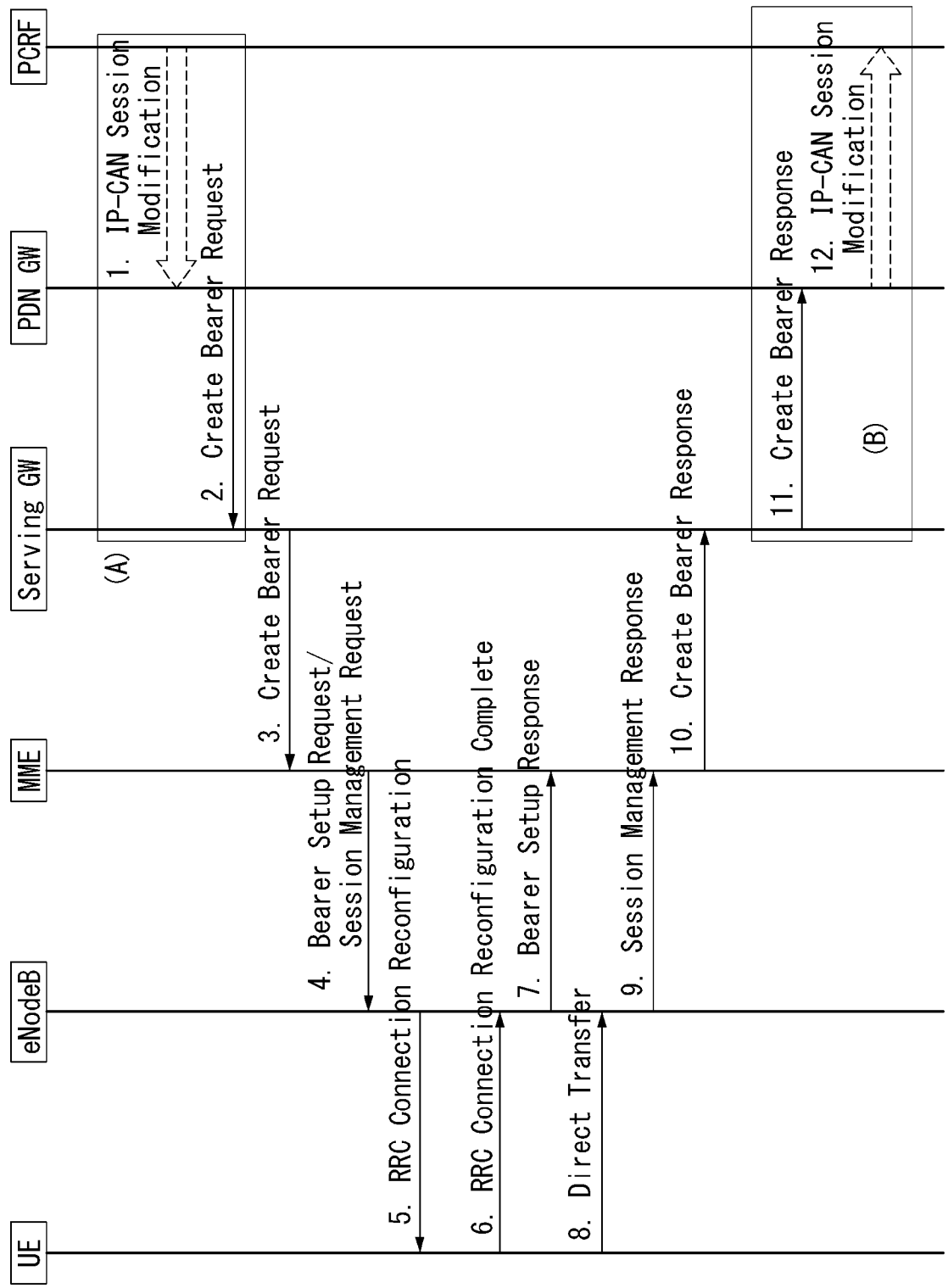

[Fig. 19]
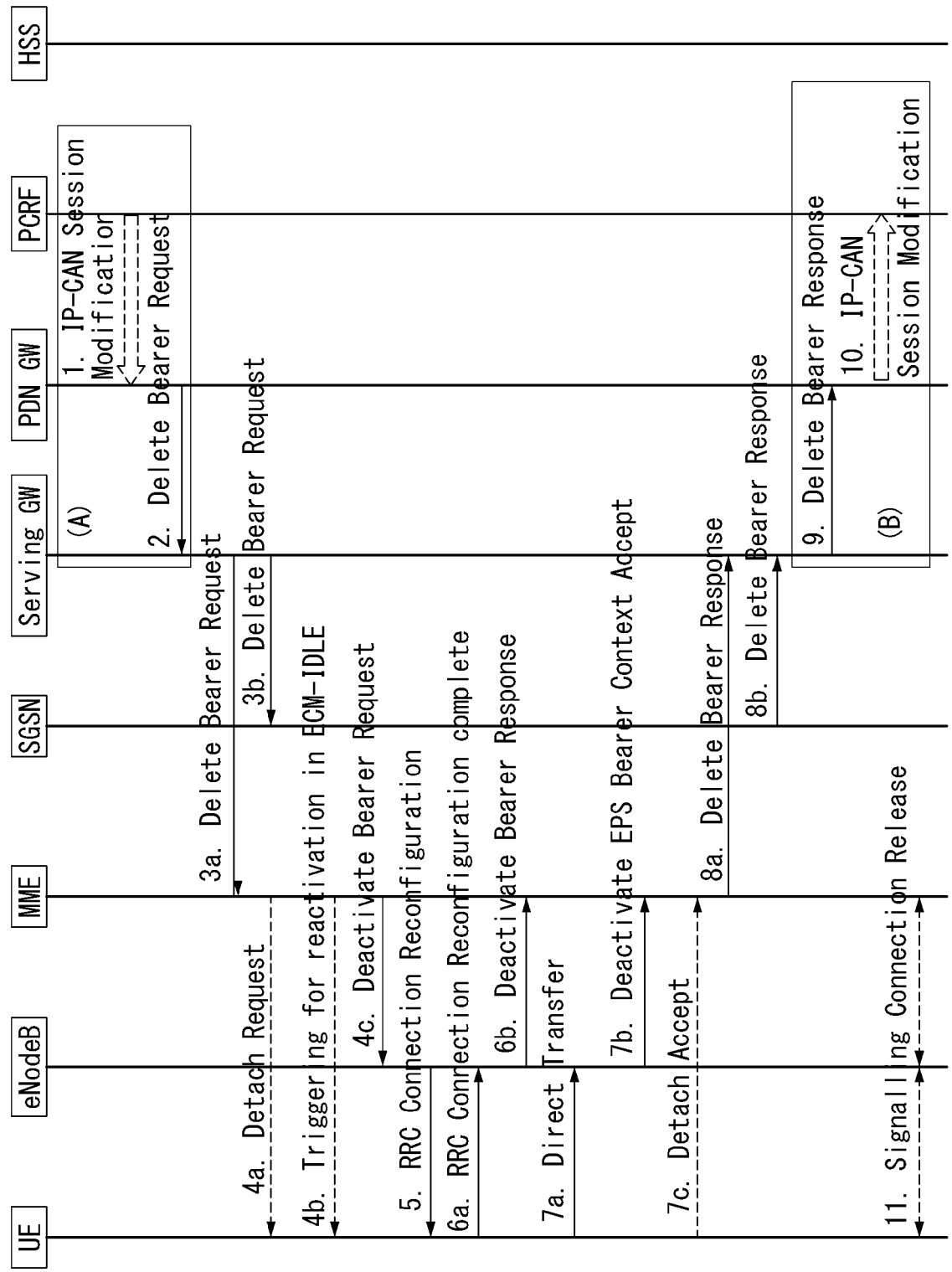

[Fig. 20]
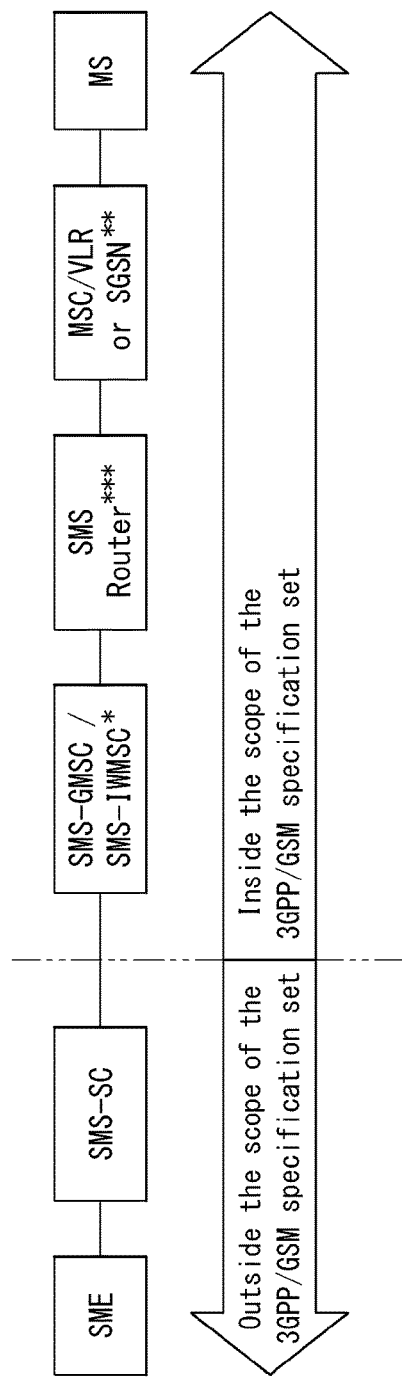
[Fig. 21]
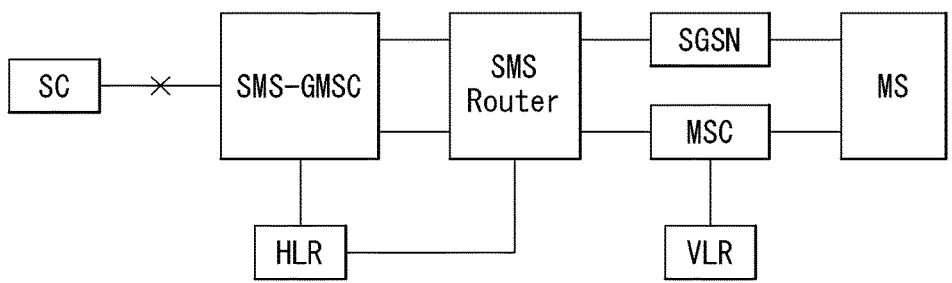

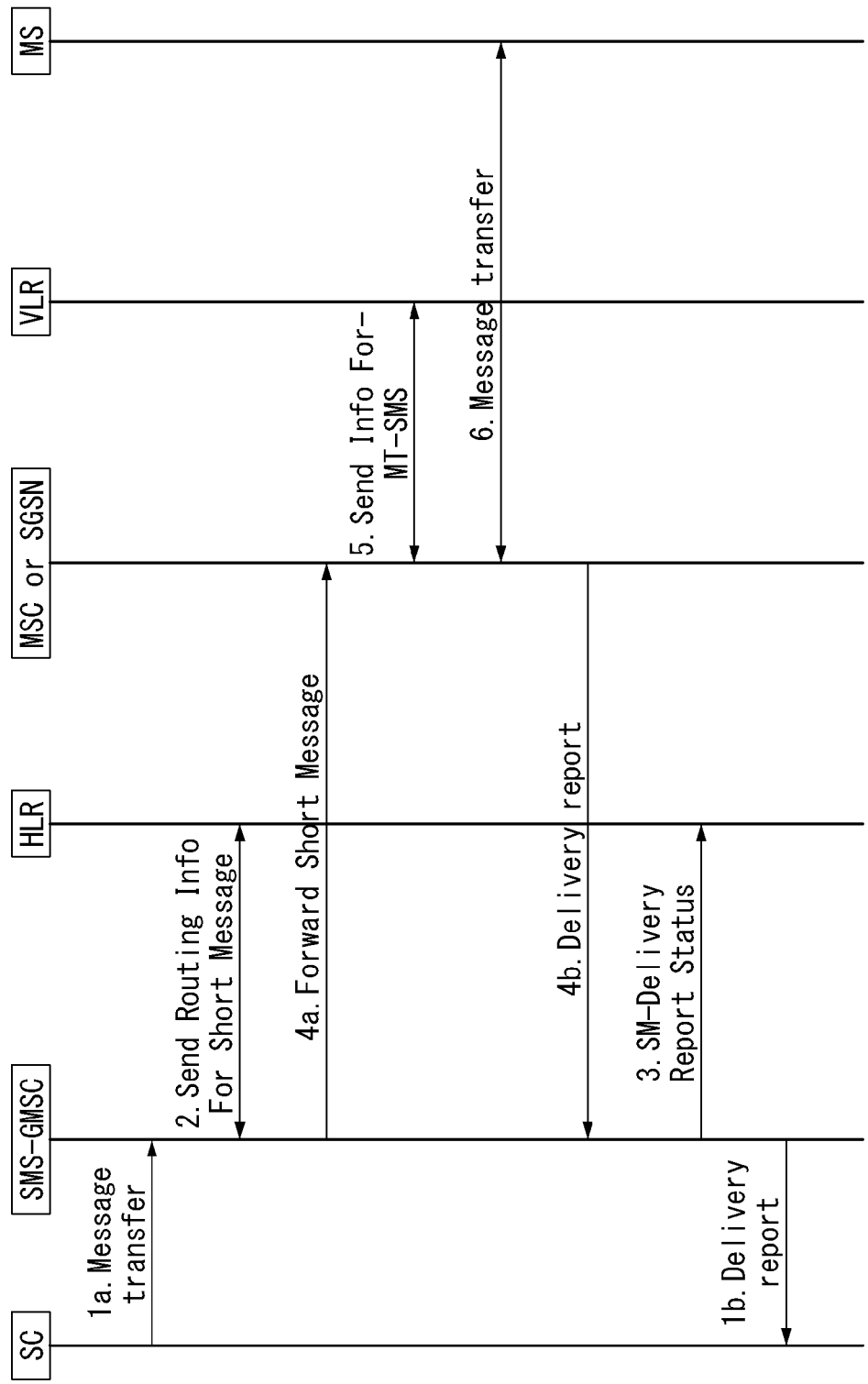
[Fig. 22]

[Fig. 23]
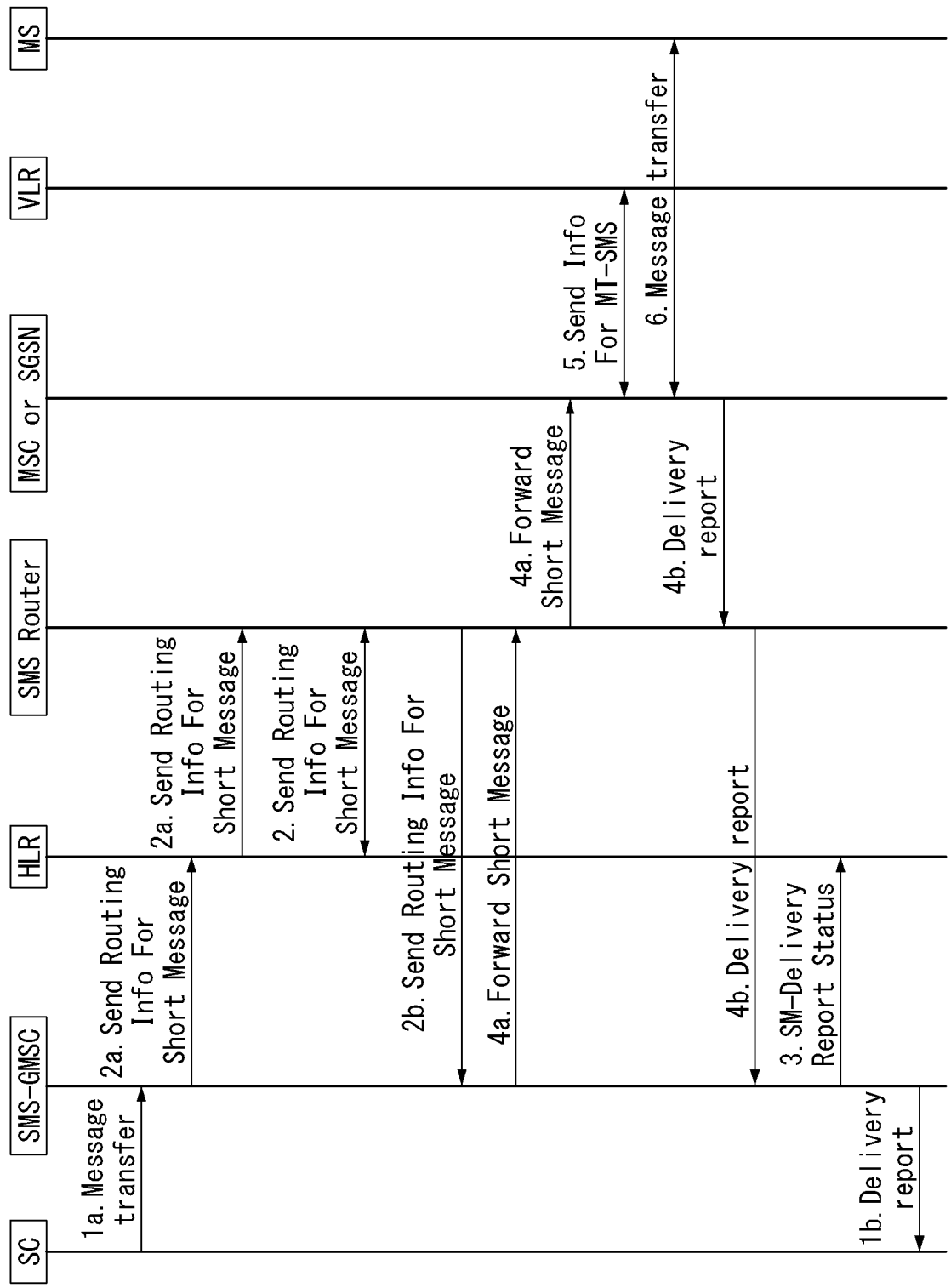

[Fig. 24]
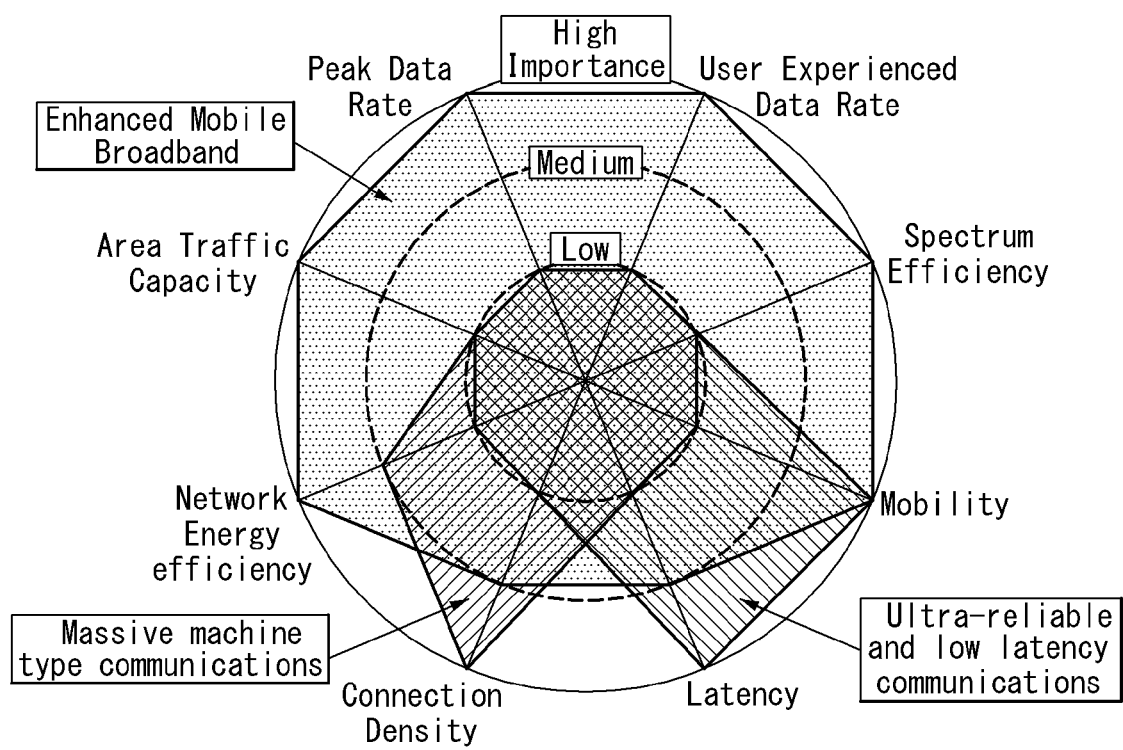

[Fig. 25]
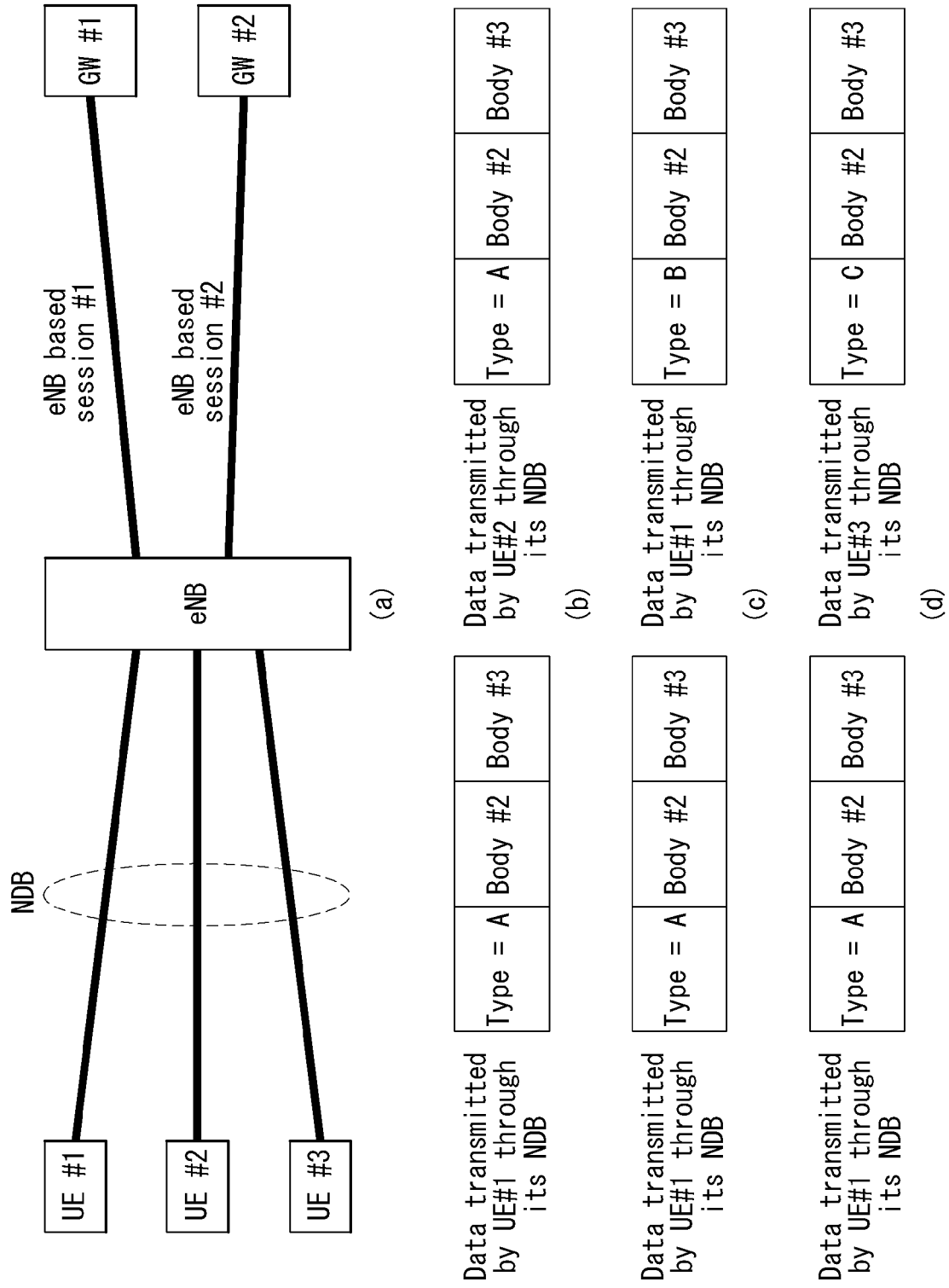

[Fig. 26]
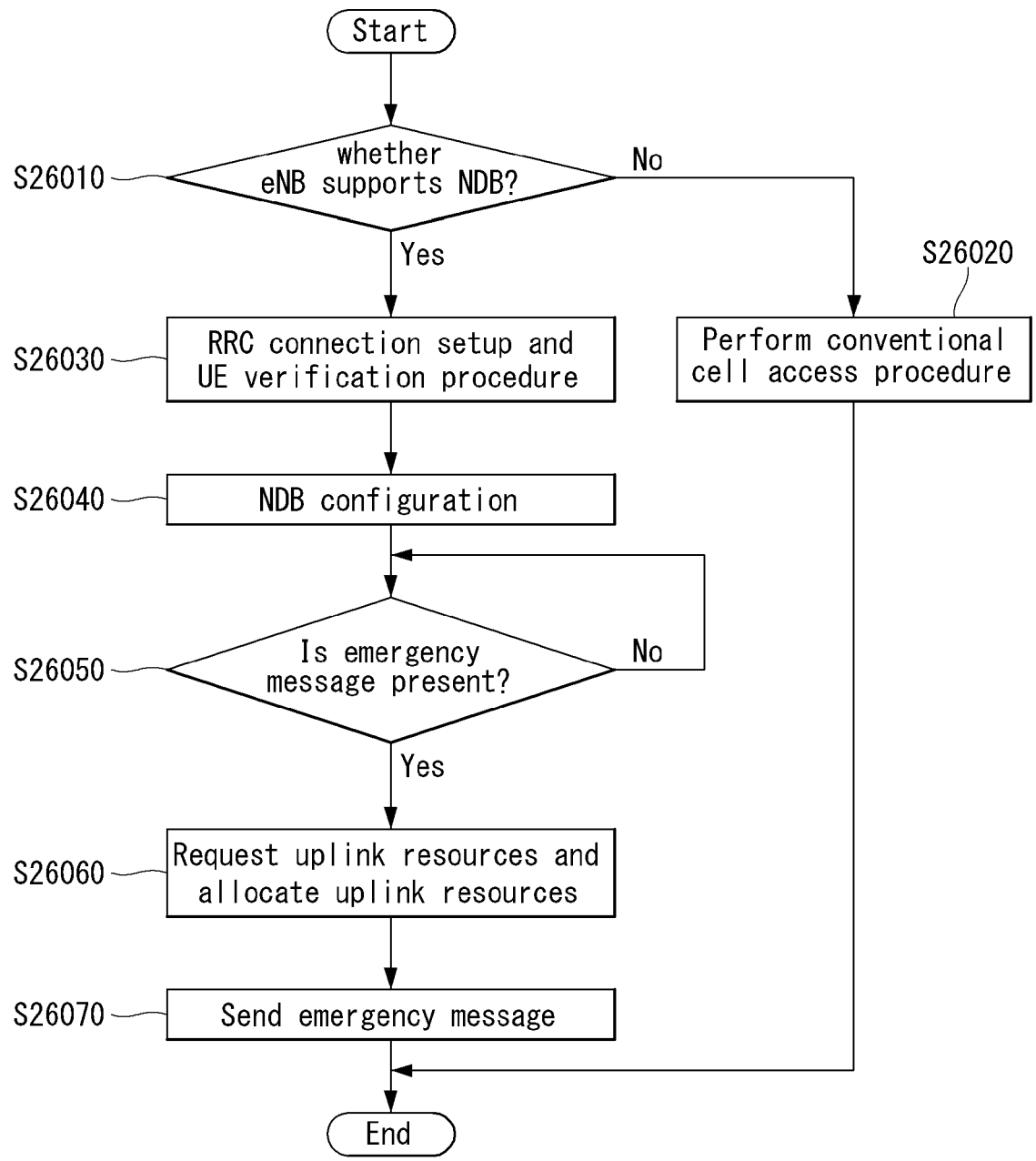

[Fig. 27]
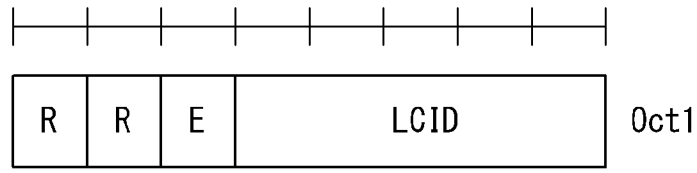
(a) R/R/E/LCID sub-header
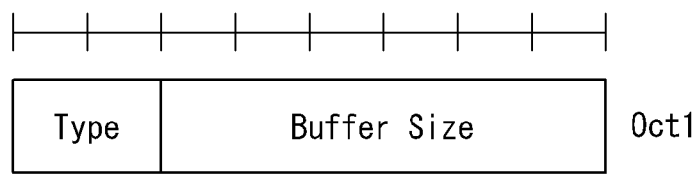
(b) MAC Control Elements
[Fig. 28]
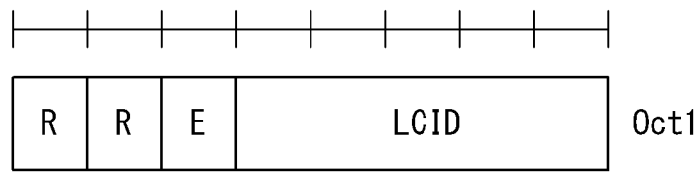
(a) R/R/E/LCID sub-header
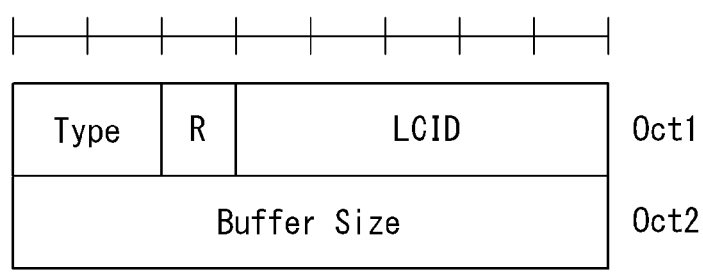
(b) MAC Control Elements

[Fig. 29]
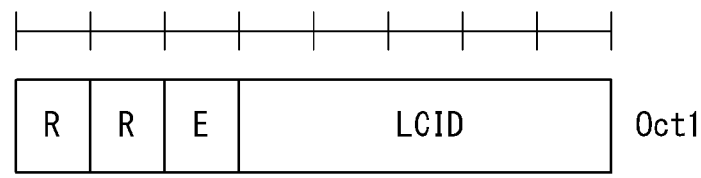
(a) R/R/E/LCID sub-header
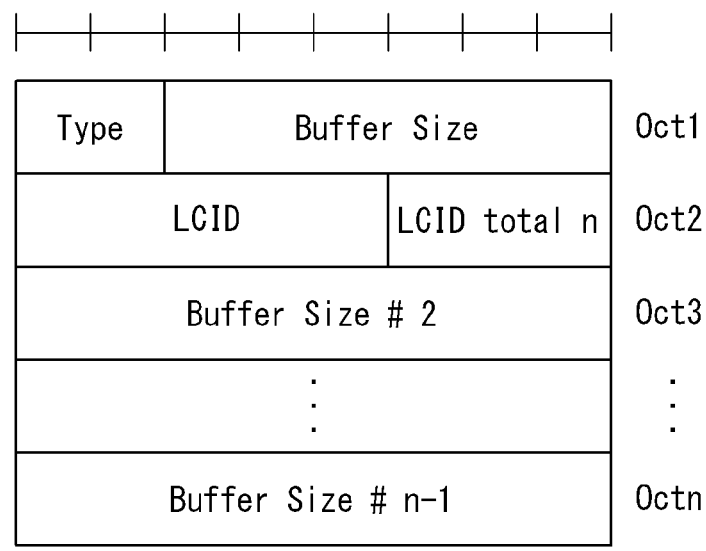
(b) MAC Control Elements

[Fig. 30]
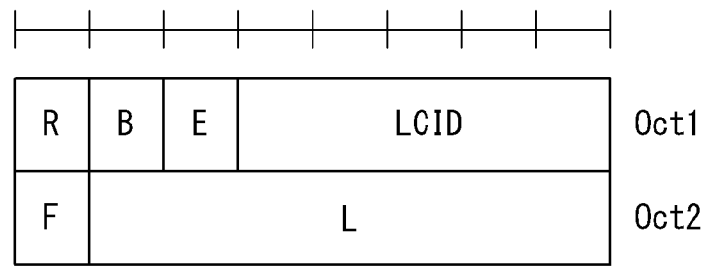
(a) R/R/E/LCID/F/L sub-header with 7-bit L field
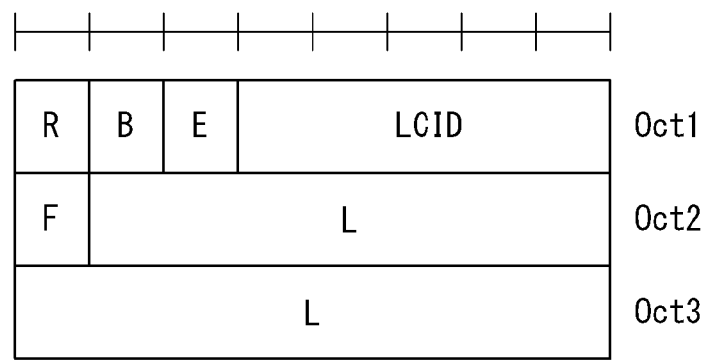
(b) R/R/E/LCID/F/L sub-header with 15-bit L field

[Fig. 31]
(a) MAC Control Elements - Type 1
(b) MAC Control Elements - Type 2
(c) MAC Control Elements - Type 3
[Fig. 32]
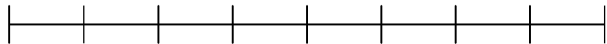

[Fig. 33]
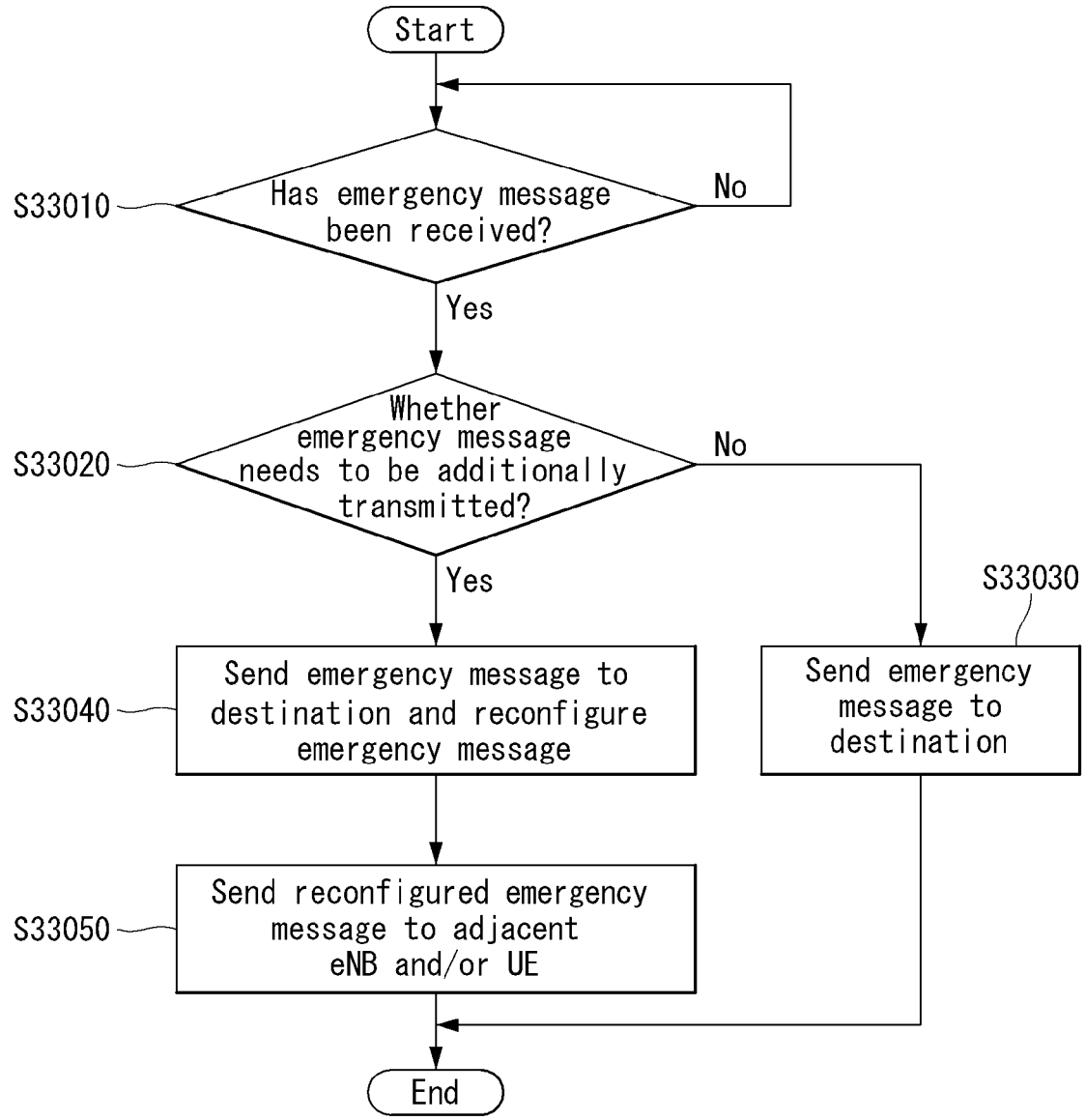
[Fig. 34]
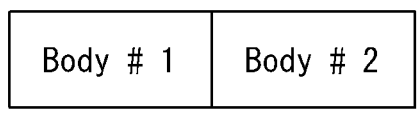

[Fig. 35]
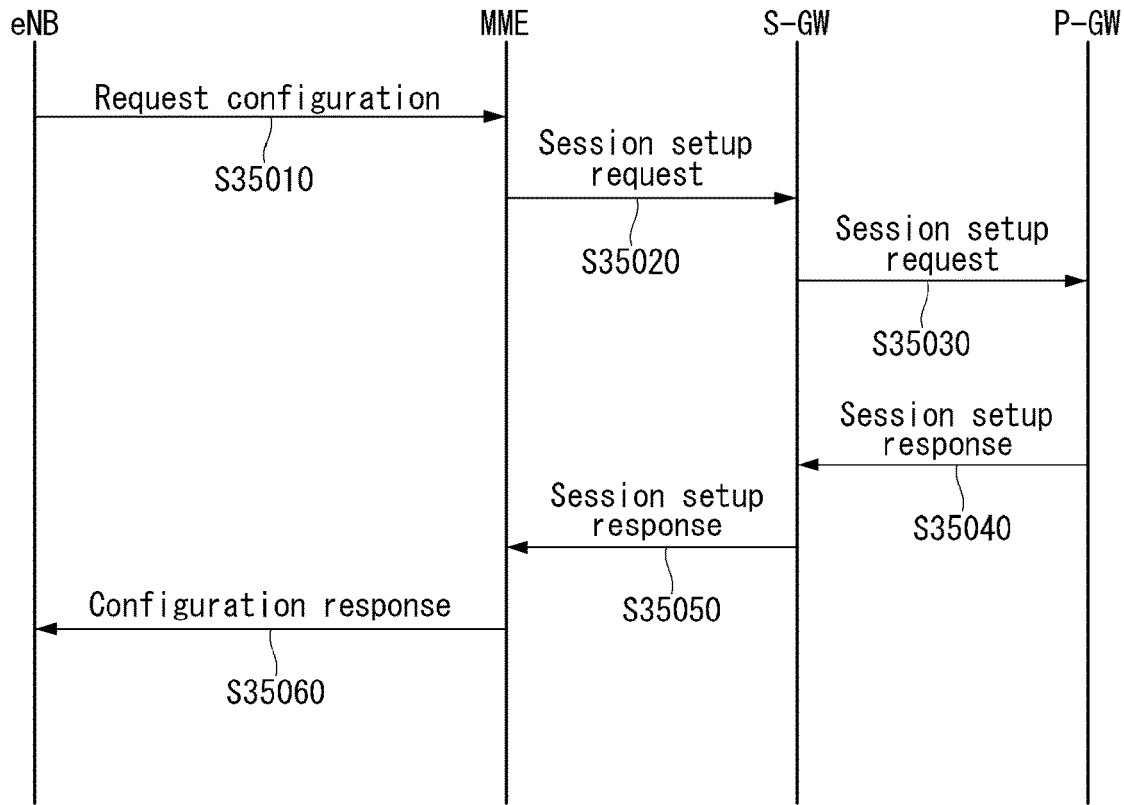
[Fig. 36]
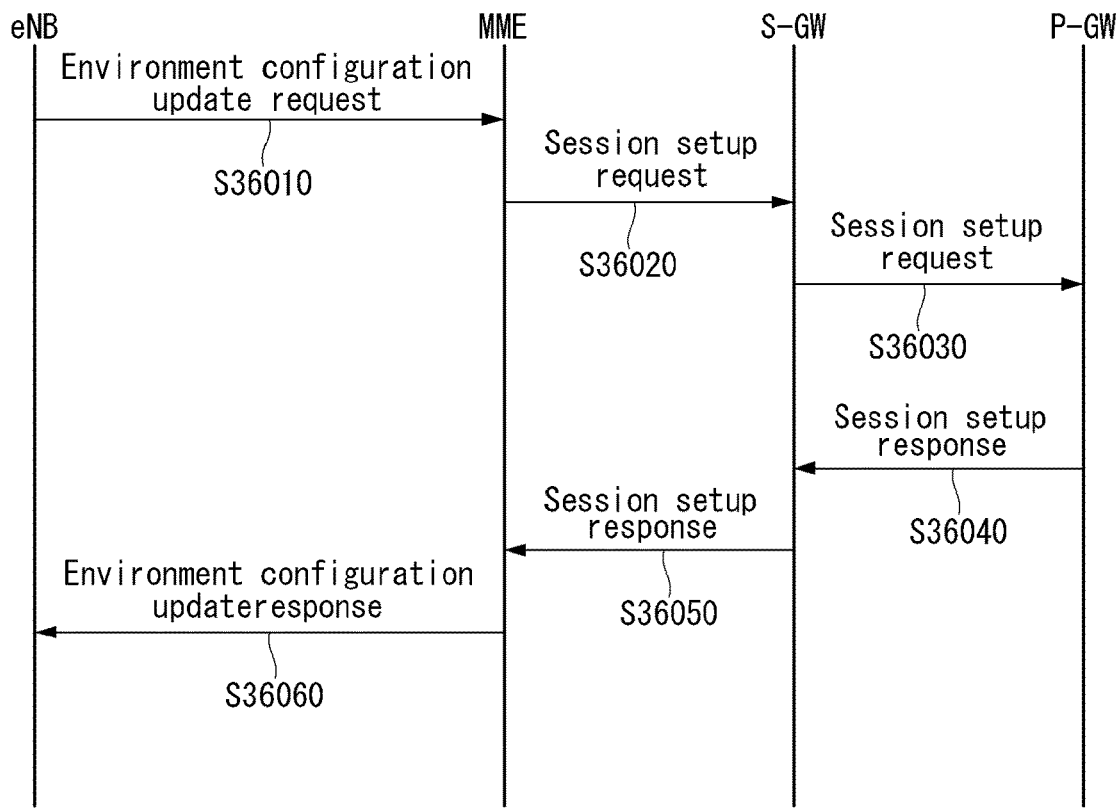

[Fig. 37]
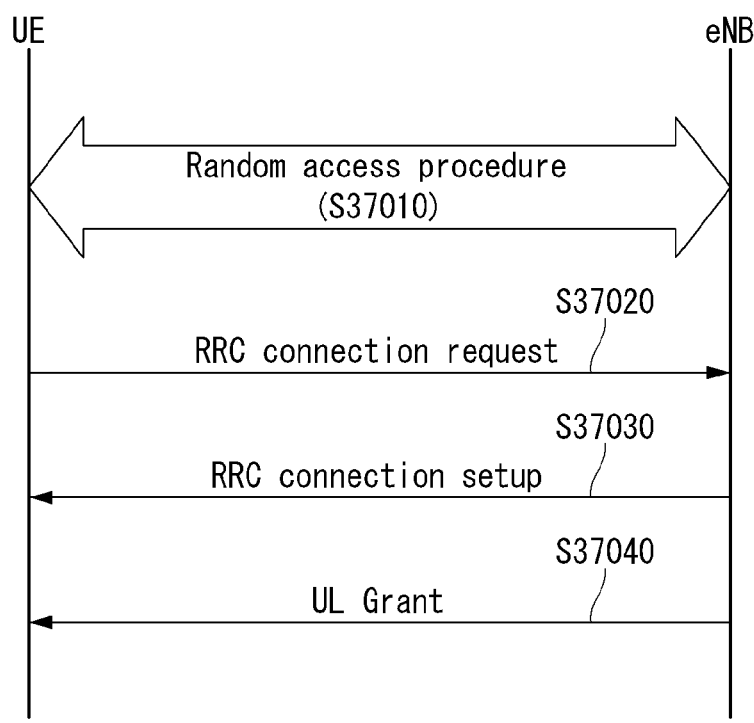

[Fig. 38]
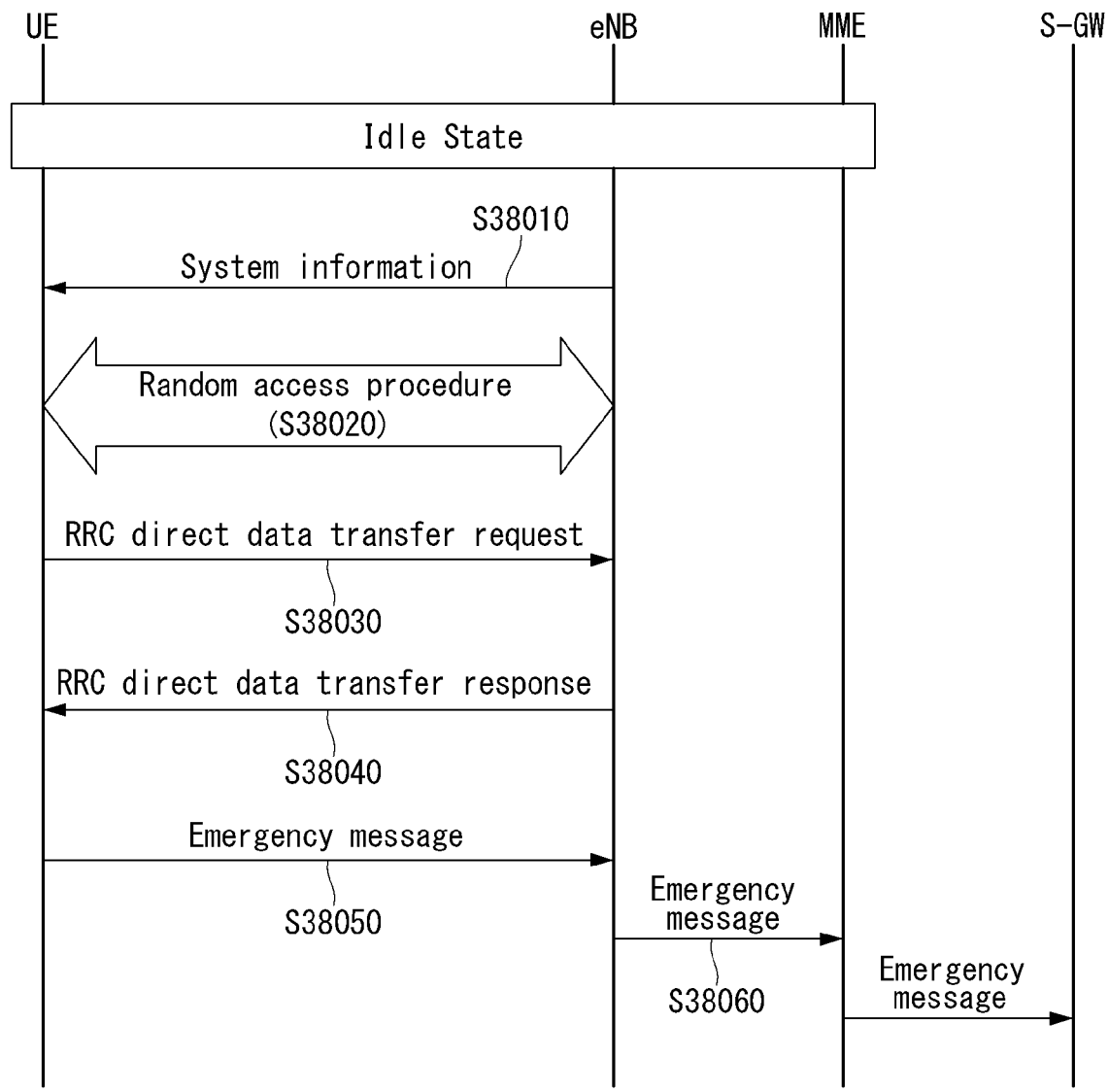

[Fig. 39]
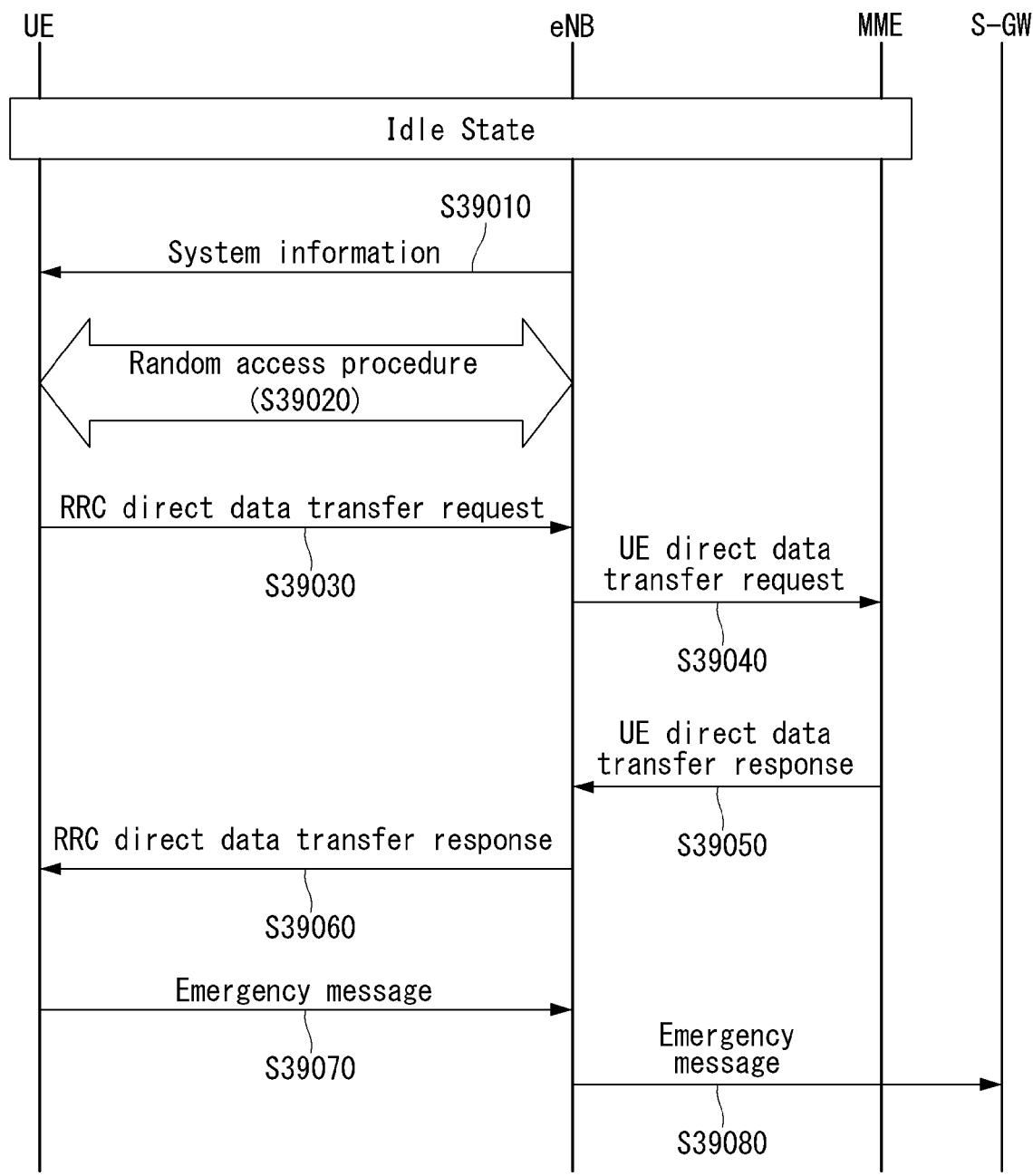

[Fig. 40]
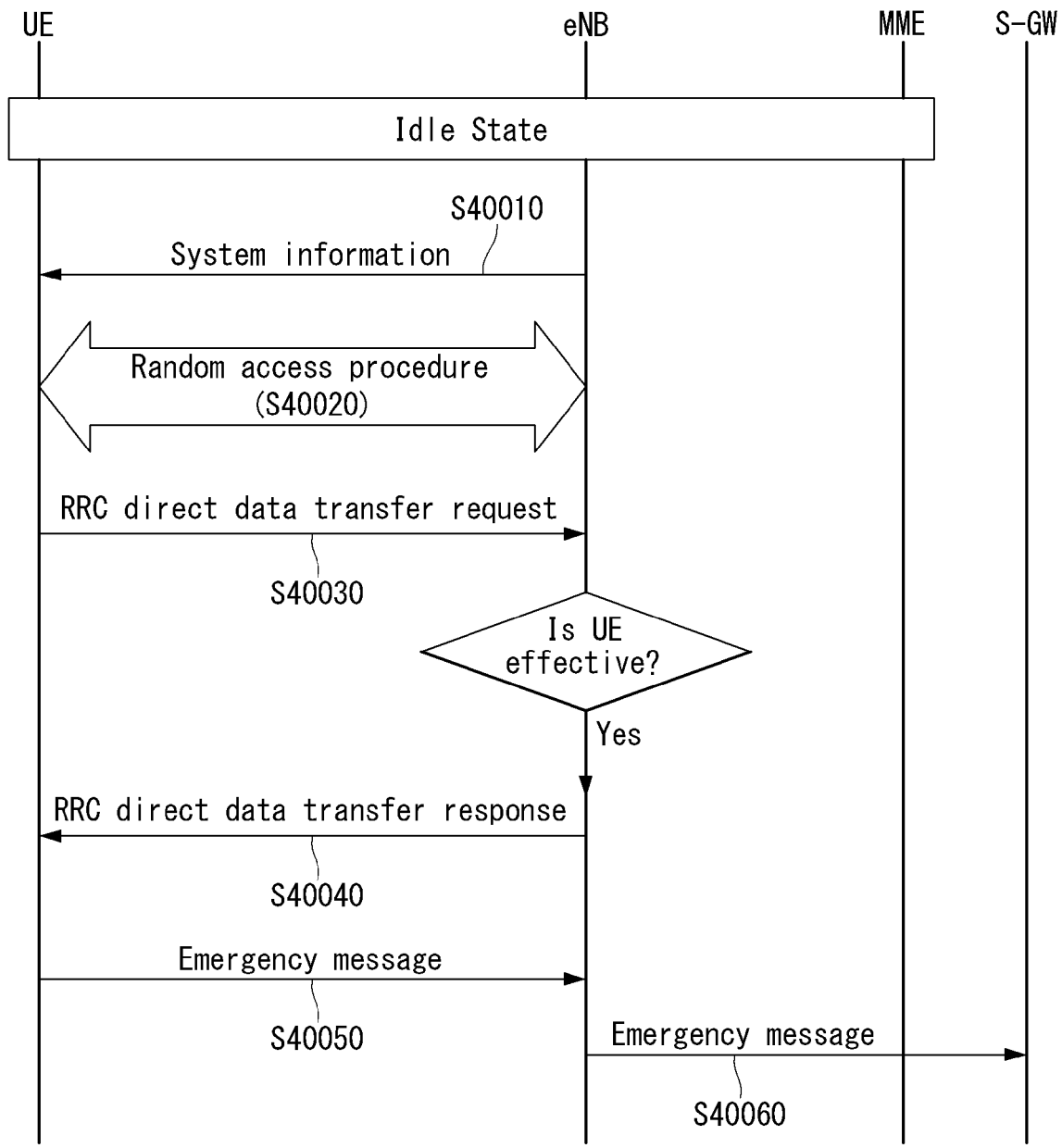

[Fig. 41]
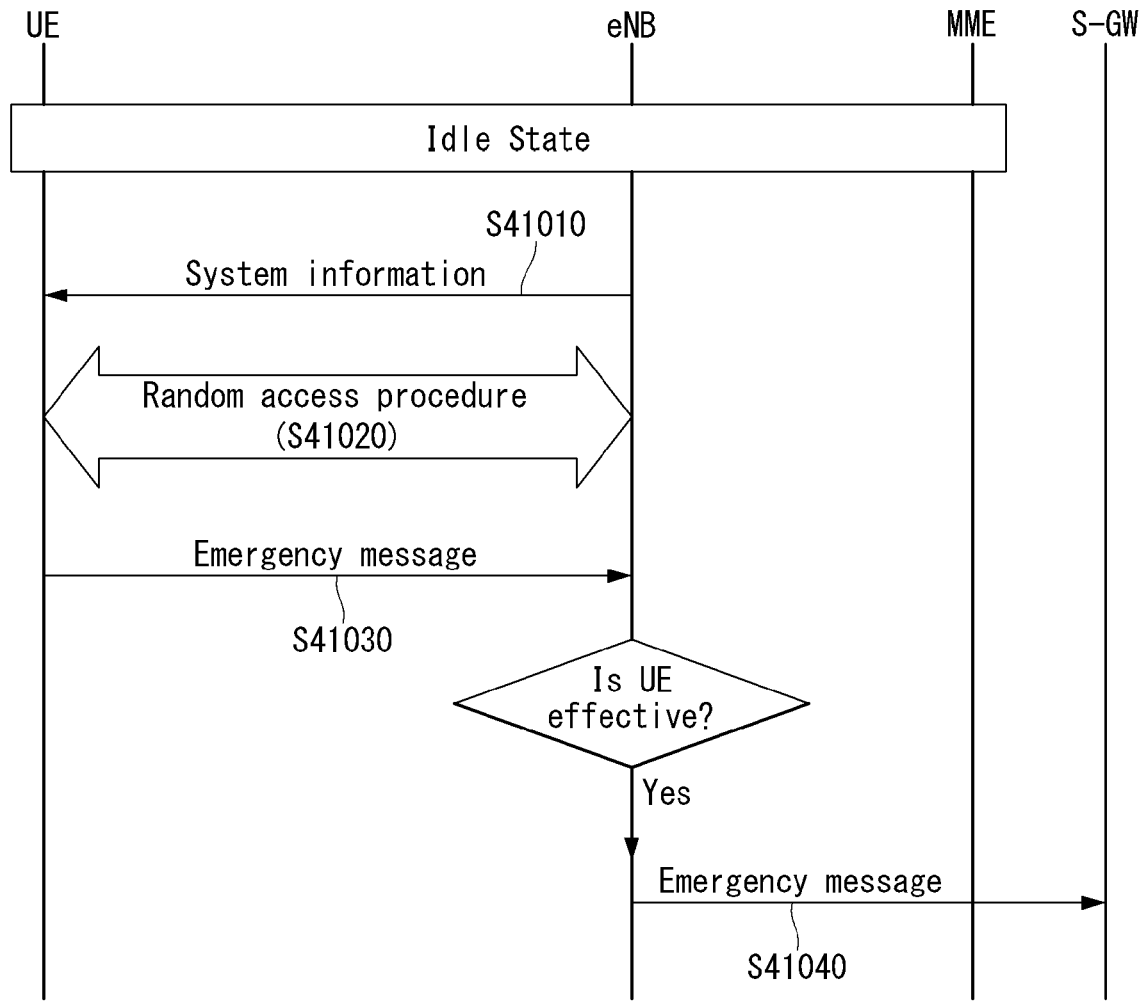
[Fig. 42]
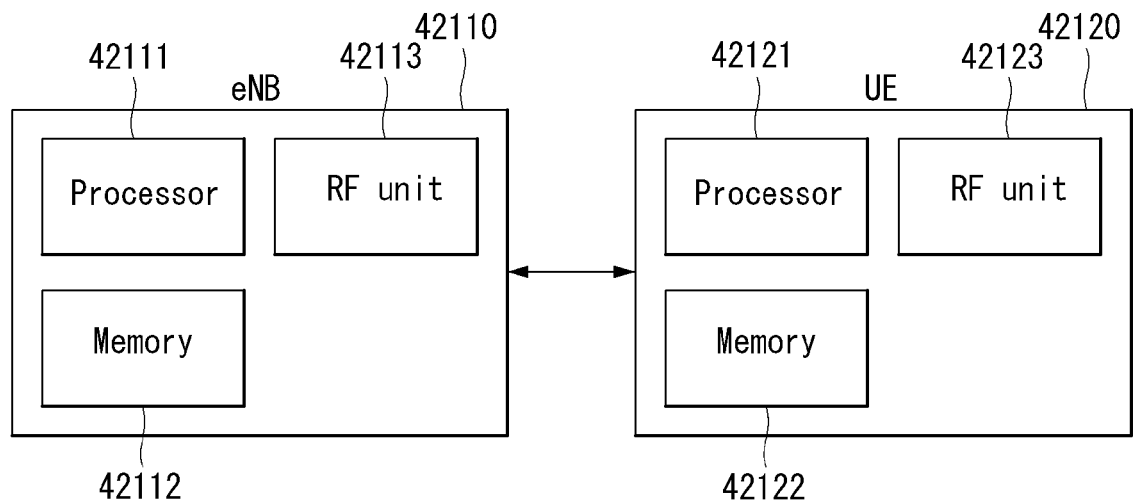

METHOD OF CONFIGURING BEARER FOR SENDING AND RECEIVING DATA IN WIRELESS COMMUNICATION SYSTEM AND APPARATUS SUPPORTING THE METHOD

CROSS REFERENCE TO RELATED APPLICATIONS

This application is the National Phase of PCT International Application No. PCT/KR2016/001173, filed on Feb. 3, 2016, which claims priority under 35 U.S.C. 119(e) to U.S. Provisional Application No. 62/161,237, filed on May 13, 2015, all of which are hereby expressly incorporated by reference into the present application.

TECHNICAL FIELD

The present invention relates to a method of sending and receiving, by an UE, data in a wireless communication system and, more particularly, to a method of configuring a bearer for providing a service whose reliability in sending and receiving data is important and an apparatus supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

Today, the radio link availability of LTE/LTE-A systems solely depends on a network coverage provision probability, which is about 95%.

Furthermore, it is assumed that radio link reliability of LTE/LTE-A systems can provide sufficient reliability owing to the retransmission of an H-ARQ because the block error rate (BER) 10-3 is applied in the case of unicast data through a PDSCH regardless of a control plane (C-Plane) and a user plane (U-Plane).

DISCLOSURE OF INVENTION

Technical Problem

An object of the present invention is to provide a method for realizing "Ultra-reliable and low-latency communication" of 5G escaping from "Best Effort Mobile Broadband" of current LTE/LTE-A systems.

Furthermore, an object of the present invention is to provide a method of sending and receiving data for providing a service that requires ultra-reliability and low latency.

Furthermore, an object of the present invention is to provide a method of configuring a bearer for providing a service that requires ultra-reliability and low latency.

Furthermore, an object of the present invention is to provide a method of configuring a separate bearer between a gateway and an eNB in order to provide a service that requires ultra-reliability and low latency.

Furthermore, an object of the present invention is to provide a method of configuring a bearer configured for each eNB between a gateway and an eNB in order to provide a service that requires ultra-reliability and low latency.

Furthermore, an object of the present invention is to provide a method of configuring a separate bearer in order to send and receive data for providing a service that requires ultra-reliability and low latency.

Furthermore, an object of the present invention is to provide a method of configuring a bearer for sending and receiving an emergency message for providing emergency situation information.

Furthermore, an object of the present invention is to provide a method for sending an emergency message for providing emergency situation information to an adjacent another UE or another eNB.

Furthermore, an object of the present invention is to provide the structure of data for providing a service that requires ultra-reliability and low latency or an emergency message for providing emergency situation information.

Technical objects to be achieved in this specification are not limited to the aforementioned objects, and those skilled in the art to which the present invention pertains may evidently understand other technical objects from the following description.

Solution to Problem

An embodiment of the present invention provides a method and apparatus for configuring a bearer for sending and receiving data in a wireless communication system.

More specifically, a method of configuring a bearer according to an embodiment of the present invention may include establishing the plurality of bearers between a plurality of network nodes and the base station, receiving a specific message through a dedicated bearer from a user equipment, the specific message including message type information indicating a type of the specific message, and transmitting the specific message to one of the plurality of network nodes through one of the plurality of bearers based on the message type information.

Furthermore, the method according to an embodiment of the present invention further comprises transmitting bearer support information and support message type information to the user equipment. The bearer support information indicates whether a dedicated bearer for transmitting and receiving the specific message is supported by the base station and the support message type information includes one or more message types capable of being transmitted through the dedicated bearer.

Furthermore, in an embodiment of the present invention, the plurality of bearers are established according to a plurality of types of services supported by the base station.

Furthermore, in an embodiment of the present invention, the step of receiving the specific message comprises establishing the dedicated bearer between the user equipment and the base station and receiving the specific message through the dedicated bearer.

Furthermore, in an embodiment of the present invention, the step of establishing the dedicated bearer comprises receiving an Radio resource control(RRC) connection request message from the user equipment and transmitting an RRC connection setup message including configuration information related to the dedicated bearer in response to the RRC connection request message. The RRC connection request message includes a cause field indicating an RRC connection request for transmitting the specific message.

Furthermore, in an embodiment of the present invention, one of the RRC connection request message or the specific message further includes an indicator indicating whether the dedicated bearer is supported by the user equipment.

Furthermore, the method according to an embodiment of the present invention further comprises receiving an uplink resource request message for the specific message from the user equipment and transmitting an uplink resource allocation message to the user equipment in response to the uplink resource request message.

Furthermore, the method according to an embodiment of the present invention further comprises receiving a buffer status report(BSR) message. The BSR message includes at least one of a logical channel ID (LCID) field or one or more size fields, the LCID field indicates that the BSR message is used for transmitting the specific message, and the one or more size fields indicates a size of the specific message.

Furthermore, in an embodiment of the present invention, the BSR message further includes a field indicating a number of the one or more size fields.

Furthermore, in an embodiment of the present invention, the step of receiving the specific message comprises receiving a request message for requesting a transmission of the specific message from the user equipment transmitting a response message including resource information for transmitting the specific message in response to the request message and receiving the specific message from the user equipment based on the resource information.

Furthermore, in an embodiment of the present invention, the request message includes at least one of an indicator or the message type information, and the indicator indicates whether the dedicated bearer is supported by the user equipment.

Furthermore, in an embodiment of the present invention, the bearer support information and the support message type information are included in system information, and the system information is transmitted in the form of a system information block.

Furthermore, in an embodiment of the present invention, the specific message includes at least one of a first body field including information related to the specific message, a second body field, a third body field, or a length field indicating a length of each body field.

Furthermore, in an embodiment of the present invention, the first body field includes at least one of the message type information, destination information indicating a destination to which the specific message is to be transmitted, or additional transmission information indicating whether the specific message needs to be transmitted to a other user equipments and a other eNBs, the second body field includes at least one of location information or address information related to a location where an specific situation has occurred, and the third body field includes at least one of a telephone number of the user equipment or image information about the specific situation.

Furthermore, the method according to an embodiment of the present invention further comprises transmitting the specific message to the destination and transmitting the specific message to the other user equipments and the other base stations, if the additional transmission information indicates that the specific message needs to be transmitted to the other user equipments and the other base stations.

Furthermore, in an embodiment of the present invention, the step of establishing the bearer comprises transmitting a bearer establishment request message for the establishment of the bearer to a Mobility Management Entity (MME) and receiving a bearer establishment response message from the MME in response to the bearer establishment request message. The bearer establishment request message includes at least on of the bearer support information or the support message type information, a quality-of-service (QoS) information of the specific message, the destination information, or network node address information indicating an address of the network node to which the specific message is transmitted.

Furthermore, an embodiment of the present invention provides an base station includes a communication unit configured to transmit and receive radio signals to and from the outside and a processor functionally coupled to the communication unit. The processor is configured to establish the plurality of bearers between a plurality of network nodes and the base station, receive a specific message through a dedicated bearer from a user equipment, the specific message including message type information indicating a type of the specific message, and transmitting the specific message to one of the plurality of network nodes through one of the plurality of bearers based on the message type information.

Furthermore, an embodiment of the present invention provides a wireless communication system for establishing a plurality of bearers for transmitting and receiving data. The wireless communication system comprises a base station, a user equipment, a first network node (e.g., an MME) and a second network node (e.g., a gateway). The base station, the user equipment, the first network node and the second network node are operable to transmit, by the base station, a establishment request message to the first network node for requesting establishment of a bearer configured for the base station between a second network node and the base station, transmit, by the first network node, an establishment response message to the base station in response to the establishment request message, transmit, by the base station, bearer support information and support message type information to the user equipment, wherein the bearer support information indicates whether a dedicated bearer for transmitting and receiving a specific message is supported by the base station, and wherein the support message type information indicates a message type capable of being transmitted through the bearer, transmit, by the user equipment, the specific message through the dedicated bearer to the base station, the specific message including message type information indicating a type of the specific message, transmit, by the base station, the specific message to the second network node through the bearer based on the message type information, wherein the establishment request message includes at least one of the bearer support information or the support message type information.

Advantageous Effects of Invention

An embodiment of the present invention can provide a service that requires ultra-reliability and low latency by defining a method of configuring a bearer for sending and receiving data in a wireless communication system.

Furthermore, an embodiment of the present invention can configure a separate bearer an UE and an eNB for the transmission and reception of an emergency message for providing emergency situation information.

Furthermore, an embodiment of the present invention can configure a bearer between a network node and an eNB for each eNB in order to send and receive an emergency message for providing emergency situation information.

Furthermore, an embodiment of the present invention can reduce overhead and latency by configuring a separate bearer for sending and receiving an emergency message and managing bearers for each network node.

Furthermore, an embodiment of the present invention can secure a high scheduling priority through a separate buffer and an uplink resource request by configuring a separate bearer for sending and receiving an emergency message.

Furthermore, an embodiment of the present invention can prevent an additional emergency situation by sending an emergency message for providing emergency situation information to an adjacent another UE and another eNB.

Advantages which may be obtained in this specification are not limited to the aforementioned advantages, and various other advantages may be evidently understood by those skilled in the art to which the present invention pertains from the following description.

BRIEF DESCRIPTION OF DRAWINGS

FIG. 1 is a view illustrating an Evolved Packet System which is associated with the
Long Term Evolution (LTE) system to which the present invention can be applied.

FIG. 2 illustrates a wireless communication system to which the present invention is FIG. 3 illustrates a functional split of an E-UTRAN and an EPC to which the present invention can be applied.

FIG. 4(a) is a diagram illustrating a radio protocol architecture for a user plane. FIG. 4(b) is a diagram illustrating a radio protocol architecture for a control plane.

FIG. 5 illustrates physical channels used for the 3GPP LTE/LTE-A system to which the present invention can be applied and a general signal transmission method using the physical channels.

FIG. 6 is a flowchart showing an RRC connection establishment procedure to which the present invention can be applied.

FIG. 7 is a flowchart showing an RRC connection reconfiguration procedure to which the present invention can be applied.

FIG. 8 illustrates a format of an MAC control element for reporting a buffer state in a wireless communication system to which the present invention can be applied.

FIG. 9 illustrates one example of a component carrier and carrier aggregation in a wireless communication system to which the present invention can be applied.

FIG. 10 illustrates a contention-based random access procedure in a wireless communication system to which the present invention can be applied.

FIG. 11 illustrates a non-contention based random access procedure in a wireless communication system to which the present invention can be applied.

FIG. 12 illustrates latency required for each process of a contention-based random access procedure required by the 3GPP LTE-A system to which the present invention can be applied.

FIG. 13 illustrates one example of a random access procedure in the LTE system.

FIG. 14 is a diagram illustrating an EMM state and an ECM state in a wireless communication system to which an embodiment of the present invention may be applied.

FIG. 15 is a diagram illustrating the structure of a bearer in a wireless communication system to which an embodiment of the present invention may be applied.

FIG. 16 is a diagram illustrating the transmission path of a control plane and a user plane in an EMM-REGISTERED state in a wireless communication system to which an embodiment of the present invention may be applied.

FIG. 17 is a diagram showing an example of a procedure for activating a default bearer.

FIG. 18 is a diagram showing an example of a procedure for activating a dedicated bearer.

FIG. 19 is a diagram showing an example of a procedure for deactivating a dedicated bearer.

FIG. 20 is a diagram showing an example of the configuration of a basic network.

FIG. 21 shows an example of interfaces included in a short message mobile-terminated procedure.

FIGS. 22 and 23 show examples of a short message mobile-terminated procedure.

FIG. 24 is a diagram showing an example of the type of 5G services and requirements.

FIG. 25 is a diagram showing an example of the structure of a bearer in a wireless communication system to which an embodiment of the present invention may be applied.

FIG. 26 is a diagram showing an example of a method of configuring a bearer in a wireless communication system to which an embodiment of the present invention may be applied.

FIGS. 27 to 29 show examples of an MAC PDU for sending an emergency message in a wireless communication system to which an embodiment of the present invention may be applied.

FIGS. 30 and 31 show another example of an MAC PDU for sending an emergency message in a wireless communication system to which an embodiment of the present invention may be applied.

FIG. 32 shows an example of the structure of data for an emergency message in a wireless communication system to which an embodiment of the present invention may be applied.

FIGS. 33 and 34 are diagrams showing examples of a method and data structure for forwarding an emergency message in a wireless communication system to which an embodiment of the present invention may be applied.

FIG. 35 is a flowchart illustrating an example of a method of generating an interface between network nodes to which an embodiment of the present invention may be applied.

FIG. 36 is a flowchart illustrating an example of a method of changing the environment configuration of an interface between network nodes to which an embodiment of the present invention may be applied.

FIG. 37 is a flowchart illustrating an example of an RRC connection procedure for configuring a bearer for sending an emergency message to which an embodiment of the present invention may be applied.

FIG. 38 is a flowchart illustrating an example of a method of sensing an emergency message in the idle state to which an embodiment of the present invention may be applied.

FIG. 39 is a flowchart illustrating another example of a method of sensing an emergency message in the idle state to which an embodiment of the present invention may be applied.

FIG. 40 is a flowchart illustrating another example of a method of sensing an emergency message in the idle state to which an embodiment of the present invention may be applied.

FIG. 41 is a flowchart illustrating another example of a method of sensing an emergency message in the idle state to which an embodiment of the present invention may be applied.

FIG. 42 is a diagram showing an example of the internal block diagram of a wireless apparatus to which an embodiment of the present invention may be applied.

MODE FOR THE INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

A message, frame, signal, field, and apparatus described in this specification have been provided to described an embodiment of the present invention, are not limited to respective names, and may be replaced with a different message, frame, signal, field, and apparatus performing the same functions.

FIG. 1 is a view illustrating an Evolved Packet System which is associated with the Long Term Evolution(LTE) system to which the present invention can be applied.

The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station(20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention can be applied.

Referring to the FIG. 3, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE ACTIVE state. In the EPC, and as mentioned above, the gateway may perform functions of paging origination, LTE IDLE state management, ciphering of the user plane, System Architecture Evolution (SAE) bearer control, and ciphering and integrity protection of NAS signaling.

FIG. 4(a) is a diagram illustrating a radio protocol architecture for a user plane. FIG. 4(b) is a diagram illustrating a radio protocol architecture for a control plane. The user plane is a protocol stack for user data transmission. The control plane is a protocol stack for control signal transmission.

Referring to FIGS. 4(a) and 4(b), a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

FIG. 5 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S501 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S502 step to obtain more specific system information.

Next, the UE may carry out a random access procedure such as the steps of S503 to S506 to complete a connection process to the eNB. To this purpose, the UE transmits a preamble S503 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S506.

Afterwards, the UE which has carried out the procedure above may carry out reception S507 of the PDCCH signal and/or PDSCH signal and transmission S508 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) 'Radio Resource Control (RRC); Protocol specification (Release 8)', the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIB s. The SIB is a group of a plurality of pieces of system information related to each other. For example, an SIB includes only information of a neighboring cell, and another SIB includes only information of an uplink radio channel used by the UE.

FIG. 6 is a flowchart showing an RRC connection establishment procedure to which the present invention can be applied.

A UE sends to a network an RRC connection request message for requesting an RRC connection S6010. The network sends an RRC connection setup message in response to the RRC connection request S6020. After receiving the RRC connection setup message, the UE enters an RRC connection mode.

The UE sends to the network an RRC connection setup complete message used to confirm successful completion of the RRC connection establishment S6030.

FIG. 7 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection S7010. In response to the RRC connection reconfiguration, the UE sends to the network an RRC connection reconfiguration complete message used to confirm successful completion of the RRC connection reconfiguration S7020.

Buffer Status Reporting (BSR)

FIG. 8 illustrates an MAC PDU used by an MAC entity in a wireless communication system to which the present invention can be applied.

With reference to FIG. 8, the MAC PDU includes an MAC header, at least one MAC service data unit (SDU), and at least one MAC control element; and may further comprise padding. Depending on the situation, at least one of the MAC SDU and the MAC control element may not be included in the MAC PDU.

As shown in FIG. 8, the MAC control element usually precedes the MAC SDU. And the size of the MAC control element can be fixed or varied. In case the size of the MAC control element is variable, whether the size of the MAC control element has been increased can be determined through an extended bit. The size of the MAC SDU can also be varied.

The MAC header can include at least one or more sub-headers. At this time, at least one or more sub-headers included in the MAC header correspond to the MAC SDU, MAC control element, and padding, respectively, which the order of the sub-headers is the same as the disposition order of the corresponding elements. For example, as shown in FIG. 10, if the MAC PDU includes an MAC control element 1, an MAC control element 2, a plurality of MAC SDUs, and padding, sub-headers can be disposed in the MAC header so that a sub-header corresponding to the MAC control element 1, a sub-header corresponding to the MAC control element 2, a plurality of sub-headers corresponding respectively to the plurality of MAC SDUs, and a sub-header corresponding to padding can be disposed according to the corresponding order.

The sub-header included in the MAC header, as shown in FIG. 8, can include 6 header fields. More specifically, the sub-header can include 6 header fields of R/R/E/LCID/F/L.

As shown in FIG. 12, for the sub-header corresponding to the MAC control element of a fixed size and the sub-header corresponding to the last one among the data fields included in the MAC PDU, sub-headers including 4 header fields can be used. Therefore, in case a sub-header includes 4 fields, the four fields can be R/R/E/LCID.

FIGS. 9 and 10 illustrate a sub-header of an MAC PDU in a wireless communication system to which the present invention can be applied.

In the following, each field is described with reference to FIGS. 9 and 10.

1) R: Reserved bit, not used.

2) E: Extended bit, indicating whether the element corresponding to a sub-header is extended. For example, if E field is '0', the element corresponding to the sub-header is terminated without repetition; if E field is '1', the element corresponding to the sub-header is repeated one more time and the length of the element is increased twice of the original length.

3) LCID: Logical Channel Identification. This field is used for identifying a logical channel corresponding to the MAC SDU or identifying the corresponding MAC control element and padding type. If the MAC SDU is related to a sub-header, this field then indicates a logical channel which the MAC SDU corresponds to. If the MAC control element is related to a sub-header, then this field can describe what the MAC control element is like.

Table 1 shows the LCID values for DL-SCH.

TABLE 1

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 2 shows LCID values for UL-SCH.

TABLE 2

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In the LTE/LTE-A system, a UE can report its buffer state to the network by setting an index value for any of a truncated BSR in the LCID field, a short BSR, and a long BSR.

The index values and a mapping relationship of the LCID values of Tables 1 and 2 are shown for an illustrative purpose, and the present invention is not limited to the example.

4) F: Format field. Represents the size of the L field

5) L: Length field. Represents the size of the MAC SDU corresponding to a sub-header and the size of the MAC control element. If the size of the MAC SDU corresponding to a sub-header or the size of the MAC control element is equal to or smaller than 127 bits, 7 bits of the L field can be used (FIG. 9(a)) and 15 bits of the L field can be used for the other cases (FIG. 9(b)). In case the size of the MAC control element varies, the size of the MAC control element can be defined through the L field. In case the size of the MAC control element is fixed, the F and the L field may be omitted as shown in FIG. 10 since the size of the MAC control element can be determined without defining the size of the MAC control element through the L field.

FIG. 11 illustrates a format of an MAC control element for reporting a buffer state in a wireless communication system to which the present invention can be applied.

In case the truncated BSR and short BSR are defined in the LCID field, the MAC control element corresponding to a sub-header can be configured to include a logical channel group identification (LCG ID) field and a buffer size field indicating a buffer state of the logical channel group as shown in FIG. 11(a). The LCG ID field is intended to identify a logical channel group to which to report a buffer state and can have the size of two bits.

The buffer size field is intended to identify the total amount of data available for all of the logical channels belonging to a logical channel group after the MAC PDU is created. The available data include all of the data that can be transmitted from the RLC layer and the PDCP layer, and the amount of data is represented by the number of bytes. The buffer size field can have the size of 6 bits.

In case a long BSR is defined for the LCID field of a sub-header, the MAC control element corresponding to a sub-header can include 4 buffer size fields indicating buffer states of the four groups having LCG IDs ranging from 0 to 3 as shown in FIG. 11(b). Each buffer size field can be used to identify the total amount of data available for each logical channel group.

Uplink Resource Allocation Procedure

In the case of the 3GPP LTE/LTE-A system, a method for data transmission and reception based on scheduling of an eNB is used to maximize utilization of radio resources. This again implies that in case a UE has data to transmit, the UE requests the eNB to allocate uplink resources in the first place and is capable of transmitting data by using only the uplink resources allocated by the eNB.

FIG. 12 illustrates an uplink resource allocation process of a UE in a wireless communication system to which the present invention can be applied.

For efficient use of radio resources in uplink transmission, an eNB needs to know which data and how much of the data to transmit to each UE. Therefore, the UE transmits to the eNB the information about uplink data that the UE attempts to transmit directly, and the eNB allocates uplink resources to the corresponding UE in accordance to the UE's transmission. In this case, the information about uplink data that the UE transmits to the eNB is the amount of uplink data stored in the UE's buffer, which is called buffer status report (BSR). When radio resources on the PUSCH are allocated during a current TTI and a reporting event is triggered, the UE transmits the BSR by using the MAC control element.

FIG. 12(a) illustrates an uplink resource allocation process for actual data in case the uplink radio resources for buffer status reporting are not allocated to the UE. In other words, in the case of a UE making a transition from the DRX mode to an active mode, since no data resources are allocated beforehand, the UE has to request resources for uplink data, starting with SR transmission through the PUCCH, and in this case, an uplink resource allocation procedure of five steps is employed.

FIG. 12(a) illustrates the case where the PUSCH resources for transmitting BSR are not allocated to the UE, and the UE first of all transmits a scheduling request (SR) to the eNB to receive PUSCH resources S12010.

The scheduling request is used for the UE to request the eNB to allocate the PUSCH resources for uplink transmission in case radio resources are not scheduled on the PUSCH during a current TTI although a reporting event has occurred. In other words, when a regular BSR has been triggered but uplink radio resources for transmitting the BSR to the eNB are not allocated to the UE, the UE transmits the SR through the PUCCH. Depending on whether the PUCCH resources for SR have been configured, the UE may transmit the SR through the PUCCH or starts a random access procedure. More specifically, the PUCCH resources through the SR can be transmitted are set up by an upper layer (for example, the RRC layer) in a UE-specific manner, and the SR configuration include SR periodicity and SR sub-frame offset information.

If the UE receives from the eNB an UL grant with respect to the PUSCH resources for BSR transmission S12020, the UE transmits the BSR to the eNB, which has been triggered through the PUSCH resources allocated by the UL grant S12030.

By using the BSR, the eNB checks the amount of data for the UE to actually transmit through uplink transmission and transmits to the UE an UL grant with respect to the PUSCH resources for transmission of actual data S12040. The UE, which has received the UL grant meant for transmission of actual data, transmits to the eNB actual uplink data through the allocated PUSCH resources S12050.

FIG. 12(b) illustrates an uplink resource allocation process for actual data in case the uplink radio resources for buffer status reporting are allocated to the UE.

FIG. 12(b) illustrates the case where the PUSCH resources for BSR transmission have already been allocated to the UE; the UE transmits the BSR through the allocated PUSCH resources and transmits a scheduling request to the eNB along with the BSR transmission S12110. Next, by using the BSR, the eNB check the amount of data that the UE actually transmits through uplink transmission and transmits to the UE an UL grant with respect to the PUSCH resources for transmission of actual data S12120. The UE, which has received an UL grant for transmission of actual data, transmits actual uplink data to the eNB through the allocated PUSCH resources S12130.

Random Access Procedure (RACH)

FIG. 13 illustrates one example of a random access procedure in the LTE system.

The UE carries out the random access procedure (RACH) at the time of the initial connection in the RRC IDLE state, initial connection after radio link failure, handover requiring the RACH, and generation of uplink or downlink data requiring the RACH while in the RRC CONNECTED state. Part of RRC messages such as the RRC connection request message, cell update message, and UTRAN Registration Area (URA) update message are also transmitted through the random access procedure. Logical channels such as Common Control Channel (CCCH), Dedicated Control Channel (DCCH), and Dedicated Traffic Channel (DTCH) can be mapped to a transmission channel RACH. A transmission channel RACH is mapped to a physical channel such as the Physical Random Access Channel (PRACH).

If the UE's MAC layer commands the UE's physical layer to start PRACH transmission, the UE's physical layer first selects one access slot and one signature to transmit the PRACH preamble to the uplink Two types of random access procedure are defined: contention based and non-contention based random access procedure.

FIG. 13(a) illustrates one example of a contention based random access procedure, while FIG. 13(b) illustrates one example of a non-contention based random access procedure.

First, contention based random access procedure will be described with reference to FIG. 13(a).

The UE receives information about random access from the eNB through system information and stores the received information. Afterwards, in case random access is required, the UE transmits a random access preamble (which is also called a message 1) to the base station S13010.

If the eNB receives a random access preamble from the UE, the eNB transmits a random access response (which is also called a message 2) to the UE S13020. To be specific, downlink scheduling information with respect to the random access response message is CRC masked with a Random Access-Radio Network Temporary Identifier (RA-RNTI) and transmitted on the L1 or L2 control channel (PDCCH). The UE, having receiving a downlink scheduling signal masked with the RA-RNTI, receives a random access response message from a Physical Downlink Shared Channel (PDSCH) and decodes the received random access response message. Afterwards, the UE checks the random access response message whether it contains random access response information directed to the UE.

Existence of random access response information directed to the UE can be determined by checking a Random Access Preamble ID (RAID) with respect to a preamble that the UE has transmitted.

The random access response information includes Timing Alignment (TA) representing timing offset information for synchronization, allocation information of radio resources used for uplink, and a temporary C-RNTI for UE identification.

In case random access response information is received, the UE carries out uplink transmission (which is also called a message 3) to a uplink Shared Channel (SCH) according to the radio resource allocation information included in the response information S13030. At this time, uplink transmission may be expressed as scheduled transmission.

After receiving the uplink transmission from the UE, the eNB transmits a message for contention resolution (which is also called a message 4) to the UE through a Downlink Shared Channel (DL-SCH) S13040.

Next, non-contention based random access procedure will be described with reference to FIG. 13(b).

Before the UE transmits a random access preamble, the eNB allocates a non-contention based random access preamble to the UE S13110.

The non-contention based random access preamble can be allocated through a handover command or dedicated signaling such as a PDCCH. In case a non-contention based random access preamble is allocated to the UE, the UE transmits the allocated non-contention based random access preamble to the eNB S13120.

Afterwards, the eNB is able to transmit a random access response (which is also called a message 2) to the UE similarly to the S13020 step of the contention based random access procedure S13130.

Although HARQ has not been applied to the random access response during the random access procedure above, the HARQ can be applied to uplink transmission with respect to the random access response or a message for contention resolution. Therefore, the UE doesn't necessarily have to transmit ACK or NACK with respect to the random access response.

Next, a UL data transmission method in the LTA(-A) or 802.16 system will be described briefly.

A cellular system such as the LTE(-A) or 802.16m system employs an eNB scheduling-based resource allocation method.

In a system which employs the eNB scheduling based resource allocation method, the UE with data to be transmitted (i.e., UL data) requests resources for transmission of the corresponding data from the eNB before transmitting the data.

The scheduling request of the UE can be carried out through Scheduling Request (SR) transmission to a PUCCH or Buffer Status Report (BSR) transmission to a PUSCH.

Also, in case resources used for transmitting SR or BSR are not limited to the UE, the UE can request uplink resources from the eNB through an RACH procedure.

As described above, the eNB which has received a scheduling request from the UE allocates uplink resources to be used for the corresponding UE through a downlink control channel (i.e., UL grant message or DCI in the case of the LTE(-A) system).

At this time, a UL grant transmitted to the UE may be used to inform the UE of which subframe the resources allocated to the UE correspond to through explicit signaling, but the UL grant may be used to define a predefined timing between the UE and the eNB for resource allocation with respect to a subframe after specific time (for example, 4 ms in the case of the LTE system).

As described above, the eNB's allocating resources to the UE after X ms (for example, 4 ms in the case of the LTE(-A) system) implies that the UE allocates resources by taking into account all of the time periods for the UE to receive and decode a UL grant, to prepare data to be transmitted, and to encode the prepared data.

EMM State and ECM State

An EPS mobility management (EMM) state and an EPS connection management (ECM) state are described below.

FIG. 14 is a diagram illustrating the EMM state and the ECM state in a wireless communication system to which an embodiment of the present invention may be applied.

Referring to FIG. 14, in order to manage the mobility of UE in the NAS layer placed in the control plane of the UE and an MME, an EMM-REGISTERED state and an EMM-DEREGISTERED state may be defined depending on whether the UE has been attached to or detached from a network. The EMM-REGISTERED state and the EMM-DEREGISTERED state may be applied to the UE and the MME.

At an early stage, such as when the UE is first powered on, the UE is in the EMM-DEREGISTERED state. In order for access the network, the UE performs a process of registering it with the network through an initial attachment procedure. If the attachment procedure is successfully performed, the UE and the MME shift to the EMM-REGISTERED state. Furthermore, if the UE is powered on or in a radio link failure (e.g., if a packet error rate exceeds a reference value in a radio link), the UE is detached from the network and shifts to the EMM-DEREGISTERED state.

Furthermore, an ECM-CONNECTED state and an ECM-IDLE state may be defined in order to manage signaling connection between the UE and the network. The ECM-CONNECTED state and the ECM-IDLE state may also be applied to the UE and the MME. ECM connection includes RRC connection set up between the UE and the eNB and S1 signaling connection set up between the eNB and the MME. That is, what the ECM connection has been set up/released means that both the RRC connection and the S1 signaling connection have been set up/released.

An RRC state indicates whether the RRC layer of the UE and the RRC layer of the eNB have been logically connected. That is, if the RRC layer of the UE and the RRC layer of the eNB have been connected, the UE is in an RRC-CONNECTED state. If the RRC layer of the UE and the RRC layer of the eNB are not connected, the UE is in an RRC-IDLE state.

The network is able to check the presence of UE in the ECM-CONNECTED state for each cell and to effectively control the UE.

In contrast, the network is unable to check the presence of UE in the ECM-IDLE state. A core network (CN) manages UE in a tracking area unit, that is, an area unit greater than a cell. When the UE is in the ECM-IDLE state, the UE performs discontinuous reception (DRX) set by an NAS using an ID uniquely allocated in the tracking area. That is, the UE may receive the broadcast of system information and paging information by monitoring a paging signal in a specific paging occasion for each UE-specific paging DRX cycle.

Furthermore, when the UE is in the ECM-IDLE state, the network does not have context information about the UE. Accordingly, the UE in the ECM-IDLE state may perform a mobility-related procedure based on UE, such as cell selection or cell reselection, without a need to receive a command from the network. In the ECM-IDLE state, if the location of the UE is different from a location known to the network, the UE may notify the network of the location of the UE through a tracking area update (TAU) procedure.

In contrast, when the UE is in the ECM-CONNECTED state, the mobility of the UE is managed by a command from the network. In the ECM-CONNECTED state, the network is aware of a cell to which the UE belongs. Accordingly, the network may send and/or receive data to the UE or from the UE, may control mobility, such as the handover of the UE, and may perform cell measurement on a neighboring cell.

As described above, in order for UE to receive common mobile communication services, such as voice or data, the UE needs to shift to the ECM-CONNECTED state. At an early stage, such as the UE is first powered on, the UE is in the ECM-IDLE state as in the EMM state. When the UE is successfully registered with a corresponding network through an initial attachment procedure, the UE and an MME shift to the ECM-CONNECTED state. Furthermore, if the UE has been registered with the network, but radio resources have not been allocated to the UE because traffic has been deactivated, the UE is in the ECM-IDLE state. When uplink or downlink new traffic is generated in the corresponding UE, the UE and the MME shift to the ECM-CONNECTED state through a service request procedure.

FIG. 15 is a diagram illustrating the structure of a bearer in a wireless communication system to which an embodiment of the present invention may be applied.

When UE is connected to a packet data network (PDN) (a peer entity in FIG. 15), PDN connection is generated. The PDN connection may also be called an EPS session. The PDN is an Internet protocol (IP) network external or internal to an operator and provides the Internet or a service function, such as an IP multimedia subsystem (IMS).

The EPS session include one or more EPS bearers. The EPS bearer is a transmission path of traffic generated between the UE and a PDN GW in order for the EPS to transfer user traffic. One or more EPS bearers may be configured in each UE.

Each EPS bearer may be divided into an E-UTRAN radio access bearer (E-RAB) and an S5/S8 bearer. The E-RAB may be divided into a radio bearer (RB) and an S1 bearer. That is, a single EPS bearer corresponds to a single RB, S1 bearer, and S5/S8 bearer.

The E-RAB delivers the packet of an EPS bearer between the UE and the EPC. If the E-RAB is present, the E-RAB bearer and the EPS bearer are mapped in a one-to-one way. A data radio bearer (DRB) delivers the packet of the EPS bearer between the UE and an eNB. If the DRB is present, the DRB and the EPS bearer/E-RAB are mapped in a one-to-one way. The S1 bearer delivers the packet of the EPS bearer between the eNB and an S-GW. The S5/S8 bearer delivers the packet of the EPS bearer between the S-GW and the P-GW.

The UE binds a service data flow (SDF) to an EPS bearer in an uplink direction. The SDF is an IP flow or a collection of IP flows in which user traffic has been classified (or filtered) for each service. A plurality of SDFs includes a plurality of uplink packet filters and may be multiplexed with the same EPS bearer. In uplink, the UE stores mapping information between an uplink packet filter and a DRB in order to bind an SDF and the DRB.

The P-GW binds an SDF to an EPS bearer in a downlink direction. A plurality of SDFs includes a plurality of downlink packet filters and may be multiplexed with the same EPS bearer. In downlink, the P-GW stores mapping information between a downlink packet filter and the S5/S8 bearer in order to bind an SDF and the S5/S8 bearer.

The eNB stores one-to-one mapping information between a DRB and an S1 bearer in order to bind the DRB and the Si bearer in uplink/downlink The S-GW stores one-to-one mapping information between an S1 bearer and an S5/S8 bearer in order to bind the S1 bearer and the S5/S8 bearer in uplink/downlink.

The EPS bearer is divided into two types: a default bearer and a dedicated bearer. UE may have a single default bearer and one or more dedicated bearers for each PDN. A minimum default bearer of an EPS session for a single PDN is called a default bearer.

The EPS bearer may be classified based on an identity. The identity of the EPS bearer is allocated by the UE or the MME. A dedicated bearer(s) is combined with a default bearer by a linked EPS bearer identity (LBI).

When UE is initially attached to a network through an initial attachment procedure, an IP address is allocated to the UE, PDN connection is set up, and a default bearer is generated in an EPS section. The default bearer remains intact without being released unless the PDN connection of the UE is terminated although there is no traffic between the UE and the PDN. When the PDN connection is terminated, the default bearer is also released. In this case, bearers in the entire section forming the UE and the default bearer are not activated, but an S5 bearer directly connected to the PDN remains intact and an E-RAB bearer (i.e., a DRB and an S1 bearer) associated with radio resources are released. When new traffic is generated in the corresponding PDN, an E-RAB bearer is reconfigured and delivers traffic.

If UE uses a service (e.g., video on demand (VOD)) insufficient to receive quality of service (QoS) using only a default bearer while the UE uses a service (e.g., the Internet) through the default bearer, a dedicated bearer is generated when the UE requests (on-demand) the dedicated bearer. If there is no traffic of the UE, the dedicated bearer is released. UE or a network may generate a plurality of dedicated bearers, if necessary.

An IP flow may have a different QoS characteristic depending on whether UE uses what service. When an EPS session for UE is established or modified, a network determines the allocation of network resources to a control policy for QoS and applies them while the EPS session is maintained. This is called policy and charging control (PCC). A PCC rule is determined based on an operator policy (e.g., a QoS policy, a gate status, and a billing method).

The PCC rule is determined for each SDF. That is, an IP flow may have a different QoS characteristic depending on a service used by UE. IP flows including the same QoS are mapped to the same SDF, and the SDF is a unit on which the PCC rule is applied.

A policy and charging control function (PCRF) and a policy and charging enforcement function (PCEF) may correspond to major entities for performing such a PCC function.

The PCRF determines a PCC rule for an SDF when generating or modifying an EPS session and provides the PCC rule to a P-GW (or PCEF). The P-GW establishes a PCC rule for a corresponding SDF, detects an SDF in each transmitted/received IP packet, and applies the PCC rule to the corresponding SDF. When an SDF is transmitted to UE through an EPS, it is mapped to an EPS bearer capable of providing suitable QoS according to a QoS rule stored in a P-GW.

The PCC rule is divided into a dynamic PCC rule and a predefined PCC rule. The dynamic PCC rule is dynamically provided from a PCRF to a P-GW when an EPS session is established or modified. In contrast, the predefined PCC rule is activated or deactivated by a PCRF because it has been previously configured in a P-GW.

The EPS bearer includes a QoS class identifier (QCI) and an allocation and retention priority (ARP), that is, basic QoS parameters.

The QCI is a scalar used as a criterion for accessing node-specific parameters which control bearer level packet forwarding treatment. A scalar value has been pre-configured by a network operator. For example, the scalar may be pre-configured as any one of integer values 1 to 9.

A main object of the ARP is to determine whether the establishment or modification request of a bearer may be accepted or should be rejected if resources are restricted. Furthermore, the ARP may be used to determine which bearer(s) will be dropped by an eNB in an exceptional resource restriction (e.g., handover) situation.

An EPS bearer is divided into a guaranteed bit rate (GBR) type bearer and a non-GBR type bearer depending on a QCI resource type. A default bearer is always a non-GBR type bearer, and a dedicated bearer may be a GBR type or non-GBR type bearer.

A GBR type bearer has a GBR and a maximum bit rate (MBR), that is, QoS parameters, in addition to a QCI and an ARP. The MBR means that fixed resources are allocated (a bandwidth is guaranteed) for each bearer. In contrast, the non-GBR type bearer has an aggregated MBR (AMBR), that is, a QoS parameter, in addition to a QCI and an ARP. The AMBR means that a maximum bandwidth which may be used along with other non-GBR type bearers are allocated instead of resources allocated for each bearer.

If QoS of the EPS bearer is determined as described above, QoS of each bearer is determined for each interface. The bearer of each interface provides QoS of an EPS bearer for each interface. Accordingly, all of an EPS bearer, an RB, and an S1 bearer have a one-to-one relationship.

If UE uses a service insufficient to receive QoS using only a default bearer while using a service through a default bearer, a dedicated bearer is generated in response to a request of the UE (on-demand).

FIG. 16 is a diagram illustrating the transmission path of a control plane and a user plane in the EMM-REGISTERED state in a wireless communication system to which an embodiment of the present invention may be applied.

FIG. 16(a) illustrates the ECM-CONNECTED state, and FIG. 16(b) illustrates the ECM-IDLE state.

When UE is successfully attached to a network and thus becomes the EMM-REGISTERED state, the UE is provided with a service using an EPS bearer. As described above, the EPS bearer is divided into a DRB, an S1 bearer, and an S5 bearer for each section.

As shown in FIG. 16(a), in the ECM-CONNECTED state including user traffic, NAS signaling connection, that is, ECM connection (i.e., RRC connection and S1 signaling connection), is set up. Furthermore, S11 TP-C (GPRS Tunneling Protocol Control Plane) connection is set up between an MME and an SGW, and S5 GTP-C connection is set up between the SGW and a PDN GW.

Furthermore, in the ECM-CONNECTED state, all of the DRB, S1 bearer, and S5 bearer are configured (i.e., radio or network resources are allocated).

As shown in FIG. 16(b), in the ECM-IDLE state not including user traffic, ECM connection (i.e., RRC connection and S1 signaling connection) is released. However, the S11 GTP-C connection between the MME and the SGW and the S5 GTP-C connection between the SGW and the PDN GW remain intact.

Furthermore, in the ECM-IDLE state, both the DRB and the S1 bearer are released, but the S5 bearer maintains the configuration (i.e., the allocation of radio or network resources).

FIG. 17 is a diagram showing an example of a procedure for activating a default bearer.

The MME shall initiate the default bearer context activation procedure by sending an ACTIVATE DEFAULT EPS BEARER CONTEXT REQUEST message and enter the state BEARER CONTEXT ACTIVE PENDING S17010.

When the default bearer is activated as part of the attach procedure, the MME shall send the ACTIVATE DEFAULT EPS BEARER CONTEXT REQUEST message together with ATTACH ACCEPT and shall not start the timer T3485. When the default bearer is activated as the response to a stand-alone PDN CONNECTIVITY REQUEST message apart from the attach procedure, the MME shall send the ACTIVATE DEFAULT EPS BEARER CONTEXT REQUEST message alone, and start the timer T3485.

The MME shall assign and include an EPS bearer identity in the ACTIVATE DEFAULT EPS BEARER CONTEXT REQUEST message. The MME shall retrieve the PTI from the PDN CONNECTIVITY REQUEST message and include it in the ACTIVATE DEFAULT EPS BEARER CONTEXT REQUEST message. Both the network identifier part and the operator identifier part shall be included in the Access Point Name IE.

Upon receipt of the ACTIVATE DEFAULT EPS BEARER CONTEXT REQUEST message, the UE shall stop timer T3396 if it is running for the APN indicated in the message, and send an ACTIVATE DEFAULT EPS BEARER CONTEXT ACCEPT message and enter the state BEARER CONTEXT ACTIVE S17020. When the default bearer is activated as part of the attach procedure, the UE shall send the ACTIVATE DEFAULT EPS BEARER CONTEXT ACCEPT message together with ATTACH COMPLETE message. When the default bearer is activated as the response to the stand-alone PDN CONNECTIVITY REQUEST message, the UE shall send the ACTIVATE DEFAULT EPS BEARER CONTEXT ACCEPT message alone.

If a WLAN offload indication information element is included in the ACTIVATE DEFAULT EPS BEARER CONTEXT REQUEST message, the UE shall store the WLAN offload acceptability values for this PDN connection and use the E-UTRAN offload acceptability value to determine whether this PDN connection is offloadable to WLAN or not.

The UE checks the PTI in the ACTIVATE DEFAULT EPS BEARER CONTEXT REQUEST message to identify the UE requested PDN connectivity procedure to which the default bearer context activation is related.

Upon receipt of the ACTIVATE DEFAULT EPS BEARER CONTEXT ACCEPT message, the MME shall enter the state BEARER CONTEXT ACTIVE and stop the timer T3485, if the timer is running If the PDN CONNECTIVITY REQUEST message included a low priority indicator set to "MS is configured for NAS signaling low priority", the MME shall store the NAS signaling low priority indication within the default EPS bearer context.

If the default EPS bearer context activation is part of the attach procedure, the ESM sublayer shall notify the EMM sublayer of an ESM failure.

If the default EPS bearer context activation is not part of the attach procedure, the UE shall send an ACTIVATE DEFAULT EPS BEARER CONTEXT REJECT message and enter the state BEARER CONTEXT INACTIVE S17030.

The ACTIVATE DEFAULT EPS BEARER CONTEXT REJECT message contains an ESM cause that typically indicates one of the following cause values:

26: insufficient resources;
31: request rejected, unspecified; or
95-111: protocol errors.

Upon receipt of the ACTIVATE DEFAULT EPS BEARER CONTEXT REJECT message, the MME shall enter the state BEARER CONTEXT INACTIVE and stop the timer T3485, if the timer is running FIG. 18 is a diagram showing an example of a procedure for activating a dedicated bearer.

FIG. 18 is a flowchart illustrating a dedicated bearer activation procedure for S5/S8 based on a GPRS tunneling protocol (GTP).

First, if a dynamic PCC is deployed, a PCRF sends a PCC Decision Provision (QoS policy) message to a PDN GW.

Next, the PDN GW sends a Create Bearer Request message (IMSI, PTI, EPS Bearer QoS, TFT, S5/S8 TEID, Charging Id, LBI, Protocol Configuration Options) for requesting the creation of a bearer to a serving GW.

Next, the serving GW sends a Create Bearer Request (IMSI, PTI, EPS Bearer QoS, TFT, S1-TEID, PDN GW TEID (GTP-based S5/S8), LBI, Protocol Configuration Options) message to an MME.

Next, the MME sends a Bearer Setup Request (EPS Bearer Identity, EPS Bearer QoS, Session Management Request, S1-TEID) message for requesting a bearer configuration to an eNodeB.

Next, the eNodeB sends an RRC Connection Reconfiguration (Radio Bearer QoS, Session Management Request, EPS RB Identity) message to UE.

Next, the UE sends an RRC Connection Reconfiguration Complete message to the eNodeB in order to provide notification of radio bearer activation.

Next, the eNodeB sends a Bearer Setup Response (EPS Bearer Identity, S1-TEID) message to the MME in order to provide notification of radio bearer activation in the UE.

Next, the UE sends a Direct Transfer (Session Management Response) message to the eNodeB.

Next, the eNodeB sends an Uplink NAS Transport (Session Management Response) message to the MME.

Next, the MME sends a Create Bearer Response (EPS Bearer Identity, S1-TEID, user location information (ECGI)) message to the serving GW in order to notify a serving GW of bearer activation.

Next, the serving GW sends a Create Bearer Response (EPS Bearer Identity, S5/S8 -TEID, User Location Information (ECGI)) message to a PDN GW in order to notify the PDN GW of bearer activation.

If the dedicated bearer activation procedure has been triggered by a PCC Decision Provision message from a PCRF, the PDN GW indicates whether a requested PCC decision (QoS policy) has been performed through the PCRF.

FIG. 19 is a diagram showing an example of a procedure for deactivating a dedicated bearer.

FIG. 19 is a flowchart illustrating a dedicated bearer deactivation procedure for GPRS tunneling protocol (GTP)-based S5/S8.

The procedure of FIG. 19 may be used to deactivate a dedicated bearer or to deactivate all bearers belonging to a PDN address.

If a default bearer belonging to PDN connection is deactivated, a PDN GW deactivates all bearers belonging to the PDN connection. For a detailed procedure, reference is made to FIG. 19.

A service (short message service (SMS)) for sending a short message is described below.

The Short Message Service comprise two basic services:
SM MT (Short Message Mobile Terminated);
SM MO (Short Message Mobile Originated).

SM MT denotes the capability of the GSM/UMTS system to transfer a short message submitted from the SC(Service Centre) to one MS(Mobile Station), and to provide information about the delivery of the short message either by a delivery report or a failure report with a specific mechanism for later delivery.

SM MO denotes the capability of the GSM/UMTS system to transfer a short message submitted by the MS to one SME via an SC, and to provide information about the delivery of the short message either by a delivery report or a failure report. The message shall include the address of that SME to which the SC shall eventually attempt to relay the short message.

The text messages to be transferred by means of the SM MT or SM MO contain up to 140 octets.

An active MS shall be able to receive a short message TPDU (SMS DELIVER) at any time, independently of whether or not there is a speech or data call in progress. A report shall always be returned to the SC; either confirming that the MS has received the short message, or informing the SC that it was impossible to deliver the short message TPDU to the MS, including the reason why.

An active MS shall be able to submit a short message TPDU (SMS SUBMIT) at any time, independently of whether or not there is a speech or data call in progress. A report shall always be returned to the MS; either confirming that the SC has received the short message TPDU, or informing the MS that it was impossible to deliver the short message TPDU to the SC, including the reason why.

It is also possible for two short messages to be received in sequence having the same originating address and identification, i.e. message reference number (MO) or SC Timestamp (MT). Such a situation may be due to errors at the RP or CP layers (e.g. during inter MSC handover) where it may be a duplicated message or otherwise it may be a valid new message.

The receiving entity should therefore make provision to check other parameters contained in the short message to decide whether the second short message is to be discarded.

FIG. 20 is a diagram showing an example of the configuration of a basic network.

The exchange of messages between an MS and an SME involves the entities shown in FIG. 20.

SMS GMSC when the short message is transferred from the SC to the MS, SMS IWMSC when the short message is transferred from the MS to the SC. The SC may be integrated with the SMS GMSC/SMS IWMSC.

SGSN is used in place of the MSC for SMS transfer over GPRS.

The SMS Router is an optional functional entity, and is used only in the MT case.

The SMS includes 3 fundamental procedures:

1) Short message mobile terminated. This procedure consists of all necessary operations to:

a) transfer a short message or status report from the SC to the MS;

b) return a report to the SC, containing the result of the message transfer attempt.

2) Short message mobile originated. This procedure consists of all necessary operations to:

a) transfer a short message from the MS to the SC;

b) return a report to the MS, containing the result of the message transfer attempt.

3) Transfer of an Alert. This procedure consists of all necessary operations for an HLR or a VLR to initiate a transfer of an Alert to a specific SC, informing the SC that the MS has recovered operation.

FIG. 21 shows an example of interfaces included in a short message mobile-terminated procedure.

The SMS Router is an optional entity. If it is not present, the two interfaces extending from the right side of the SMS GMSC extend directly to the SGSN and MSC, respectively.

Since the short message mobile terminated procedure covers the functionality required at SM RL for transferring TPDUs from SC to MS, the procedure described covers both short message (SMS DELIVER) and status report (SMS STATUS REPORT) transfer. The term "short message transfer" therefore, in this clause, covers both cases.

FIGS. 22 and 23 show examples of a short message mobile-terminated procedure.

Sequence diagrams are shown for the following basic situations of short message mobile-terminated transfer attempts:

Successful short message transfer via the MSC or the SGSN;

Successful short message transfer via the SMS Router, and the MSC or SGSN;

A short message transfer attempt failing due to an error at the SMS GMSC;

A short message transfer attempt failing due to the negative outcome of HLR information retrieval;

A short message transfer attempt via the SMS Router failing due to the negative outcome of HLR information retrieval;

A short message transfer attempt failing due to an error at the MSC or SGSN;

A short message transfer attempt failing due to the negative outcome of VLR information retrieval;

A short message transfer attempt failing due to erroneous message transfer on the radio path;

A short message transfer attempt failing over the first path (e.g., the SGSN) and succeeding over the second path (e.g., the MSC);

A short message transfer attempt via the SMS Router failing over the first path (e.g., the SGSN) and succeeding over the second path (e.g., the MSC);

A short message transfer attempt failing over the first path (e.g., the SGSN) and over the second path (e.g., the MSC).

FIG. 24 is a diagram showing an example of the type of 5G services and requirements.

Referring to FIG. 24, 5G services may be basically divided into "Enhanced Mobile Broadband" in which the transmission and reception of high-capacity data are required, "Massive Machine type Communication" in which a large amount of UE attachments is required, and "Ultra-reliable and Low latency Communication" in which ultra-reliability and low latency are required.

The 5G services may include a specific service having the following characteristics and requirements. It is said that data transmission and the reception of a response thereto may be performed within a defined E2E latency time.

Broadcast-Like Services

A type scenario includes communication of traffic jam information

Regional emergency warnings can include disaster warnings. Unlike in the legacy broadcast service, the feedback channel can be used to track the delivery of a warning message to all or selected parties.

Food and/or medicine and medical supplies recall information (it is necessary to check whether a distributor receive the information)

?National or even continental/world-reach services are interesting as a substitute or complementary to broadcast services for radio or television. Also vertical industries, medical equipment, or electronic bikes will benefit from national broadcast-like services to upgrade/distribution of firmware. The automotive industry may leverage the acknowledgement broadcast capability to mitigate the need for recall campaigns. This requires software patches to be delivered in large scale, and successful updates to be confirmed and documented via the feedback channel.

Table 3 below is a table showing an example of requirements for providing the broadcast-like services.

TABLE 3

| No. 14 | Broadcast like services | |
|---|---|---|
| Main Attributes | Requirement KPI | Notes |
| User Experienced Data Rate (also at the cell edge) | DL: up to 200 Mpbs UL: Modest (e.g. 500 kbps) | The maximum data rate can be used e.g. to distribute quickly 4K/8K movies, then cached at the device. Other broadcast like services can require a much lower data rate. |
| E2E latency | <100 ms | |
| Mobility | On demand, 0-500 km/h | |
| Device autonomy | From days to years | Depends on the use case. MTC devices can need several years of autonomy |
| Connection Density | Not relevant | |
| Traffic Density | Not relevant | |

In such broadcast-like services, common service companies (e.g., logistic business, hospitals, and traffic systems) are different from companies providing the broadcast-like services (e.g., device manufacturers, and government agencies). In the broadcast-like services, data does not continue to be generated, but is generated in response to an event.

Furthermore, UE may not configure a bearer for providing such broadcast-like services because the configuration and maintenance of a bearer for providing the broadcast-like services increase overhead within a network.

Accordingly, whenever data for providing the broadcast-like services is generated, the aforementioned procedure for configuring a data bearer and session needs to be performed, which may result in transmission latency.

However, as shown in Table 3, the broadcast-like services are problematic in that data needs to be transmitted to the devices of a specific group (including devices in the idle state in addition to the connection state) within 100 ms and corresponding responses also need to be received.

Public Safety Services

The public safety organizations will need enhanced and secure communications.

This, for instance, will include real time video and ability to send high quality pictures.

The main challenge is to ensure (ultra) reliable communication over the entire footprint of the emergency services including land, sea, air, in-building and some underground areas such as basements and subway systems.

It will also require priority over other traffic (in networks shared with other users), ability for direct communication between devices, and high security.

Table 4 below is a table showing an example of requirements for providing the Public Safety Services.

TABLE 4

| No. 13 | Ultra-high availability and reliability | |
|---|---|---|
| Main Attributes | Requirement KPI | Notes |
| User Experienced Data Rate (also at the cell edge) | DL: 10 Mbps UL: 10 Mpbs | Data rate enabling real-time video and data transfers (e.g. maps) |
| E2E latency | 10 ms | |
| Mobility | On demand, 0-500 km/h | |
| Device autonomy | >3 days (standard) Up to several years for some critical MTC services | |
| Connection Density | Not critical | |
| Traffic Density | Potentially high | |

As shown in Table 4, in the public safety services, data needs to be transmitted to a specific object (e.g., a server or a surrounding device) regardless of the state of a transmission device within 10 ms, and a corresponding response needs to be received.

In such public safety services, however, data does not continue to be generated, but is generated in response to an event. UE may not configure a bearer for providing such public safety services because the configuration and maintenance of a bearer for providing the public safety services increase overhead within a network.

Accordingly, there is a problem in that latency may occur because when data for providing the public safety services is generated, UE needs to configure a bearer through the aforementioned bearer configuration process and to send the data.

More specifically, an emergency event, such as the explosion and fire of a building or a factory and the collapse and subsidence of a road, sidewalk, bridge, or building, is an emergency situation directly connected to life. UE may notify an emergency center of such a situation through SMS or an emergency call service. The emergency center performs countermeasures/responses suitable for the emergency situation.

Conventional mobile communication networks may have the following restrictions because they have been developed based on an emergency call and have been designed as simple communication paths for providing notification of an emergency situation.

Providing Restricted Emergency Situation Information

A maximum number of letters which may be delivered through SMS is determined to be 90 in English letters and 45 (90 bites) in Korean letters.

Emergency situation information provides the location of occurrence, a victim, or the telephone number of a reporter.

If a direct call with a person who experiences an emergency situation is impossible, an emergency center needs to be informed of more sufficient situation information so that the emergency center takes suitable actions. Accordingly, emergency situation information is problematic in that an emergency type, the number of victims, the place where an emergency has occurred, a photo and image, and a detailed place need to be additionally provided.

Responses for Preventing Additional Accident

A conventional mobile communication network is unaware of information (e.g., the type of emergency situation and the location where the emergency situation has occurred) about the type of transmitted message (e.g., a common message or an emergency message) and an emergency situation. Accordingly, an emergency center which has recognized the emergency situation needs to send a corresponding countermeasure notification message to surrounding UE.

An occurrence transmission path: UE→a mobile communication network→a message server→a mobile communication network→an emergency center A countermeasure notification message transmission path: an emergency center →a mobile communication network→a message server→a mobile communication network→surrounding UE Surrounding UE which has received a countermeasure notification message along such a transmission path receives the countermeasure notification message through an emergency center. Accordingly, transmission latency may occur that much.

Furthermore, UE moving at high speed or a situation (e.g., a fire or tsunami) in which an emergency situation is rapidly spread to the surroundings may require a faster response compared to common UE.

Scheduling Unit

Each SRB belongs to a logical channel group "0", and a DRB having characteristics, such as those of Table 5 below, belongs to one of four logical channel groups.

Table 5 below is a table showing an example of QCI characteristics.

That is, two SRBs having different characteristics (or priorities) belong to the same group. DRBs and SRBs may belong to the same group although they have different characteristics.

A logical channel group is a unit on which a radio resource request and a buffer state are reported.

In a conventional system, an eNB handles an SRB 2 in the same manner as a DRB or SRB having the same logical channel group because SMS is delivered through the SRB 2 and allocates radio resources according to a scheduling method.

Furthermore, in a core network, an emergency message is identically processed like common SMS.

Accordingly, there is a problem in that resource allocation for another message may be first performed compared to an emergency message because an SRB and a DRB having different priorities may be included in a single logical channel group.

In order to solve such a problem, there is proposed a method of previously generating a data bearer for providing the specific services and providing the specific services. In this case, a session for providing such services needs to be always maintained.

In particular, there is proposed a method of configuring a dedicated path or a dedicated bearer (hereinafter called a non-EPS data bearer (NDB)) through which a message that provides notification of the generation of an emergency situation and that is transmitted by UE (hereinafter called an emergency message or a specific message) can be first delivered to an eNB compared to a common control message (e.g., an RRC message or NAS message) and common data without the configuration of a separate data bearer and session.

TABLE 5

| QCI | Resource Type | Priority Level | Packet Delay Budget | Packet Error Loss Rate | Example Services |
|---|---|---|---|---|---|
| 1 | GBR | 2 | 100 ms | 10−2 | Conversational Voice |
| 2 | | 4 | 150 ms | 10−3 | Conversational Video (Live Streaming) |
| 3 | | 3 | 50 ms | 10−3 | Real Time Gaming |
| 4 | | 5 | 300 ms | 10−6 | Non-Conversational Video (Buffered Streaming) |
| 65 | | 0.7 | 75 ms | 10−2 | Mission Critical user plane Push To Talk voice (e.g., MCPTT) |
| 66 | | 2 | 100 ms | 10−2 | Non-Mission-Critical user plane Push To Talk voice |
| 5 | Non-GBR | 1 | 100 ms | 10−6 | IMS Signalling |
| 6 | | 6 | 300 ms | 10−6 | Video (Buffered Streaming), TCP-based (e.g., www, e-mail, chat, ftp, p2p file sharing, progressive video, etc.) |
| 7 | | 7 | 100 ms | 10−3 | Voice, Video (Live Streaming), Interactive Gaming |
| 8 | | 8 | 300 ms | 10−6 | Video (Buffered Streaming), TCP-based (e.g., www, e-mail, chat, ftp, p2p file, sharing, progressive video, etc.) |
| 9 | | 9 | | | |
| 69 | | 0.5 | 60 ms | 10−6 | Mission Critical delay sensitive signalling (e.g., MC-PTT signalling) |
| 70 | | 5.5 | 20 ms | 10−6 | Mission Critical Data (e.g. example services are the same as QCI 6/8/9) |

Furthermore, there is proposed a method of configuring a bearer configured for each eNB (hereinafter called a service bearer or simply "bearer") not an EPS bearer configured for each UE in order for an eNB to send an emergency message to a gateway.

The gateway is also referred to herein as a network node or as a "second network node".

The NDB is a bearer not belonging to the EPS bearer and means a logical path for sending and receiving an emergency message different from an SRB or a DRB to which the EPS bearer belongs.

Furthermore, the service bearer means a bearer configured for each eNB between an eNB and a gateway not an existing EPS bearer configured for each UE.

Furthermore, an eNB propagates such an emergence situation to surrounding UE and/or eNB depending on whether additional damage may occur due to the emergency situation recognized through a received emergency message.

In an embodiment of the present invention, the eNB is an entity in which a function required to process the emergency message has been implemented and has been described as an example. Accordingly, an embodiment of the present invention does not restrict an entity in which the corresponding function has been implemented to an eNB.

FIG. 25 is a diagram showing an example of the structure of a bearer in a wireless communication system to which an embodiment of the present invention may be applied.

Referring to FIG. 25, an NDB for sending an emergency message may be configured for each UE between UE and an eNB. A service bearer may be configured for each eNB between an eNB and a gateway in order to send an emergency message depending on a service type.

More specifically, FIG. 25(a) shows the structure of bearers between UE and an eNB and between the eNB and gateways. The aforementioned NDB is configured for each UE between UE and the eNB.

The NDB means a logical path for sending and receiving an emergency message between the UE and the eNB and is different from an SRB and a DRB belonging to an EPS bearer.

In FIG. 25(a), UE #1, UE #2, and UE #3 are connected to the eNB through their NDBs.

In an embodiment of the present invention, a point of time at which an NDB is configured is as follows.

An NDB is configured simultaneously with RRC connection setup (a message including configuration information: an RRC connection setup message)

An NDB is configured right after an AS security configuration is completed (a message including configuration information: an RRC connection reconfiguration)

An NDB is configured right after emergency data is generated (a request message: an NDB request, a message including configuration information: an RRC connection reconfiguration)

Furthermore, the service bearer is configured between the eNB and the gateway. The service bearer is a bearer through which an emergency message for providing the specific services are transmitted and received by the eNB and the gateway and is configured for each eNB not for each UE.

The service bearer may be configured depending on a provided service. That is, a different service bearer may be configured depending on the type of service and quality characteristics. Although an eNB receives data from different UEs, if the data is data for providing the same service, the data may be transmitted to a gateway through the same service bearer.

In FIG. 25(a), the eNB is connected to a GW #1 and a GW #2 through respective service bearers.

A method of sending data through the bearers described with reference to FIG. 25(a) is described below with reference to FIGS. 25(b) to 25(d).

First, if received data is data for providing the same service although the eNB receives the data from different UEs, the eNB may send the data to a gateway through the same service bearer.

More specifically, in FIG. 25(b), UE #1 and UE #2 send data to the eNB through respective NDBs. The eNB which has received the data from the UE #1 and the UE #2 sends the data to the gateway GW #1 or GW #2 through the same service bearer (a service bearer 1 or a service bearer 2) because the data have the same type.

Second, if data received from the same UE is data for providing different services, the eNB may send the data to gateways through different service bearers.

More specifically, in FIG. 25(c), the UE #1 sends data to the eNB through its own NDB. The eNB which has received data from the UE #1 sends the data to the gateways GW #1 and the GW #2 through different service bearers (e.g., type A is a service bearer 1 and type B is a service bearer 2) because the received data has different types A and B.

Third, although data received from respective UEs has different types, the eNB may send the data to a gateway through the same service bearer.

More specifically, in FIG. 25(d), the UE #1 and the UE #3 send data to the eNB through respective NDBs. The eNB which has received the data from the UE #1 and the UE #3 send the data to a gateway GW #1 or GW #2 through the same service bearer (the service bearer 1 or the service bearer 2) if the received data has the same quality characteristics although the data has different types A and C.

If an emergency message is transmitted to a gateway without the configuration of an EPS bearer based on each UE using such a method, UE may IP-packetize the emergency message by reusing an IP address allocated through an EPS bearer previously configured in the UE in order to send another data because an IP address for sending the emergency message has not been allocated to the UE and send the IP-packetized emergency message to an eNB. Alternatively, if the IP address is not reused, the UE may send the emergency message to the eNB in a signal form. The eNB may IP-packetize the emergency message through an IP address allocated when a service bearer is configured and send the emergency message to a gateway.

An NDB, that is, a bearer of a UE unit for sending an emergency message, may be configured between UE and an eNB and a service bearer, that is, a bearer of an eNB unit, may be configured between the eNB and a gateway through the method of FIG. 25, and data may be transmitted and received.

FIG. 26 is a diagram showing an example of a method of configuring a bearer in a wireless communication system to which an embodiment of the present invention may be applied.

Referring to FIG. 26, after RRC connection setup and the effectiveness (integrity) verification of UE are completed, the UE may send an emergency message through a non-EPS data bearer (NDB) and a service bearer, that is, a transmission path for sending the emergency message.

More specifically, the UE receives bearer support information indicating whether a non-EPS data bearer (hereinafter called a "NDB"), that is, a bearer that is used for the eNB to provide the specific service, that is, a bearer for sending and receiving an emergency message that is a message for providing notification of an emergency situation (e.g., a traffic accident, a fire, or a heart failure) or a message that needs to be rapidly transmitted, and a message type field indicative of the type of emergency message which may be transmitted through the NDB from an eNB.

Table 6 below shows an example of message types which may be included in the message type field.

TABLE 6

| Value | Type |
|-------|------|
| 0000 | Explosion |
| 0001 | Fire |
| 0010 | Collapse |
| 0011 | Crack |
| 0100 | Subsidence |
| 0101 | Traffic accident |
| 0110 | Flooding |
| 0111 | Heart failure |
| 1000 | Landside |
| 1001 | Typhoon |
| 1010 | Tsunami |
| 1011 | Heavy snow |
| 1100 | Heat wave |
| 1101 | Flood |
| ... | ... |

The message types of Table 6 are illustrative, and an emergency message of a type not included in Table 6 may also be transmitted and received through an NDB.

Furthermore, the kind and type of emergency messages which may be transmitted and received through the NDB of Table 6 may be statically defined or may be dynamically delivered from the eNB to the UE.

In this case, the bearer support information may be included in a system information block which is used to send and receive the aforementioned system information.

The UE which has received the bearer support information may determine whether the eNB supports an NDB at step S26010.

If the eNB does not support the NDB, the UE performs an existing cell access procedure along with the eNB at step S26020.

If the eNB supports the NDB, the UE performs an RRC connection setup and UE verification procedure for sending the emergency message along with the eNB at step S26030.

The UE sends an RRC connection request message to the eNB in order to set up RRC connection with the eNB. In this case, the RRC connection request message may include a cause field indicative of a reason why the RRC connection request is transmitted and/or an NDB indicator, that is, an indicator indicating whether the UE supports the NDB.

The cause field may be determined as follows depending on a transmitted message.

Common control/data: mt-Access, mo-Signaling, mo-Data

An existing emergency call service: emergency

An emergency message service: enhanced emergency or public safety

Thereafter, the UE may receive an RRC connection setup complete message, including configuration information for an NDB configuration, from the eNB as a response to the RRC connection request message and may configure the NDB at step S26040.

If the UE is effective and the eNB and the UE support the NDB, the eNB configures the NDB along with the UE. In this case, the configuration of the NDB is performed regardless of the cause field of the RRC connection request message.

That is, although the cause field is not indicative of an emergency data service, the eNB and the UE may configure the NDB.

Although there is no emergency message to be transmitted by the UE, the NDB may be generated when an RRC connection procedure is performed between the UE and the eNB and may be maintained until the RRC connection between the UE and the eNB is released.

Furthermore, a plurality of the NDBs may be configured for each UE depending on the value of an environment configuration (e.g., RLC mode, a maximum retransmission threshold, a logical channel identity, priority: the highest priority, a prioritized bit rate, and quality of service (QoS)).

The emergency message transmitted through the NBD may be independently managed in a separate buffer and is not managed in the form of the aforementioned logical channel group so that the emergency message is combined with the buffer of another SRB and/or DRB and a buffer state is not reported.

Thereafter, if an emergency message is present at step S26050, the UE may send a BSR for requesting uplink resources for sending the emergency message and reporting a buffer state to the eNB and may receive uplink resources allocated by the eNB at step S26060.

In this case, while requesting uplink resource allocation, the UE may send a buffer status report message for a buffer status report to the eNB.

Thereafter, the UE sends the emergency message to the eNB through the allocated uplink resources at step S26070.

In this case, the emergency message may include a type field indicative of the type of emergency message shown in Table 6 and a destination field indicative of a destination to which the emergency message needs to be transmitted or an additional transmission field indicating whether the emergency message needs to be transmitted to another UE and another eNB.

The emergency message for providing the specific services may be transmitted through such a method. In this case, latency is reduced because the emergency message is transmitted through a previously configured bearer.

FIGS. 27 to 29 show examples of an MAC PDU for sending an emergency message in a wireless communication system to which an embodiment of the present invention may be applied.

Referring to FIGS. 27 to 29, at step S26060 of FIG. 26, the buffer status report (BSR) may be configured through an MAC PDU using an LCID.

Table 7 below is a table showing an example of LCID values for an UL-SCH.

TABLE 7

| INDEX | LCID VALUES |
|-------|-------------|
| 00000 | CCCH |
| 00001-01010 | Identity of Logical Channel |
| 01011 | CCCH |
| 01100-10110 | Reserved |
| 10111 | Ehanced Emergency BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |

FIG. 27(a) shows a sub-header, and FIG. 27(b) shows MAC control elements. The LCID field of the sub-header is set to "10111" of FIG. 7 indicative of a buffer status report message for emergency data transmission.

In FIG. 27(b), a type field is a value indicative of the type of MAC information element. That is, the type field is set to classify the MAC control elements of FIGS. 27 to 29. A buffer size field is indicative of the size of emergency data accumulated in a buffer.

Table 8 below is a table showing an example of LCID values for an UL-SCH.

TABLE 8

| INDEX | LCID VALUES |
|---|---|
| 00000 | CCCH |
| 00001-01010 | Identity of Logical Channel |
| 01011 | CCCH |
| 01100-10110 | Reserved |
| 10111 | LCID based BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 28(a) shows a sub-head, and FIG. 28(b) shows MAC control elements. The LCID field of the sub-header may be set to "10111" indicative of an LCID-based buffer status report message.

In FIG. 28(b), a type field is set as a value indicative of the type of MAC information element, and an LCID may be set as an LCID mapped to a bearer configured for emergency data transmission.

Furthermore, a buffer size field is indicative of the size of emergency data accumulated in a buffer.

FIG. 29 shows an example of an MAC PDU if a plurality of buffer states is reported. In FIG. 29(b), an "LCID total n" is indicative of a total number of LCIDs whose buffer states are to be reported. An MAC control element includes an LCID total n, an LCID that belongs to two or more LCIDs and that has the smallest value, and buffer size fields indicative of the size of data accumulated in the buffer of each LCID. In this case, the two or more LCIDs whose buffer states are to be reported have an LCID having the smallest value and continued ascending order values. For example, if an LCID total n is 3 and an LCID having the smallest value is 2, an MAC control element includes the buffer sizes of LCIDs 2, 3, and 4.

The MAC control element described with reference to FIGS. 27 to 29 may not include a type field if the LCID of each MAC control element is defined or only one of the LCIDs is used.

FIGS. 30 and 31 show another example of an MAC PDU for sending an emergency message in a wireless communication system to which an embodiment of the present invention may be applied.

Referring to FIGS. 30 and 31, unlike in FIGS. 27 to 29, a buffer status report message may be configured using an MAC sub-header.

More specifically, the LCID of an MAC sub-header shown in FIG. 30 is an LCID indicative of an emergency message (only in the case of a piggybacking BSR) to be transmitted through allocated resources and a logical channel identifier mapped to a bearer configured to send data for reporting a buffer state.

In this MAC PDU, B bits indicate whether an MAC control element for a buffer status report corresponding to an LCID is included. In the case of a stand-alone buffer status report, B bits may be set to 1, and L bits may be set to 0.

FIG. 31 shows MAC control elements corresponding to the MAC sub-header of FIG. 30.

FIG. 31(a) shows MAC control elements for a buffer status report for the LCID of the MAC sub-header shown in FIG. 30. If the buffer state of an additional LCID is to be reported in addition to the LCID of the MAC sub-header shown in FIG. 30, MAC control elements shown in FIG. 31(b) or 31(c) may be used.

FIG. 31(b) shows MAC control elements for reporting the buffer state of a single additional LCID, and FIG. 31(c) shows MAC control elements for reporting the buffer state of two or more additional LCIDs.

The MAC control elements of FIGS. 31(a) to 31(c) are classified by a type field. If only a single MAC control element is used, the type field may not be used.

FIG. 32 shows an example of the structure of data for an emergency message in a wireless communication system to which an embodiment of the present invention may be applied.

Referring to FIG. 32, an emergency message for providing the specific services described with reference to FIGS. 25 and 26 may include three body fields and length fields indicative of the lengths of respective body fields. In this case, if the length of a first body field Body #1 is fixed, a length field Body #1 Length indicative of the length of the first body field may not be included.

The first body field may include pieces of common information about the emergency message. For example, the first body field may include type information indicative of the type of emergency message, destination information indicative of a destination to which the emergency message needs to be transmitted, and a secondary damage information indicating whether an additional emergency situation may occur or additional transmission information indicating whether the emergency message needs to be transmitted to another UE or another eNB.

A second body field Body #2 may include information which may be delivered to another UE and/or eNB, for example, an emergency situation or information about the location where the emergency situation has occurred (e.g., information about the place, such as a building, a factory, a bridge, a road, or a sidewalk) and information about the detailed address of the place, in addition to information related to the location or the destination of the emergency message.

A third body field Body #3 may include information that may be delivered to only a destination, for example, personal information, such as information about the telephone number of an emergency person or a reporter, information about the number of emergency persons, and a photo information.

FIGS. 33 and 34 are diagrams showing examples of a method and data structure for forwarding an emergency message in a wireless communication system to which an embodiment of the present invention may be applied.

Referring to FIGS. 33 and 34, an eNB which has received an emergency message from UE or an adjacent eNB which has received an emergency message from an eNB may reconfigure the emergency message and send the emergency message to other UEs within its own coverage.

More specifically, when an eNB receives the emergency message of FIGS. 26 and 32 from an adjacent eNB or UE at step S33010, the eNB may determine the type of emergency message, a destination to which the emergency message needs to be transmitted, and whether to reconfigure the emergency message and to send the re-configured emergency message to an adjacent UE or eNB based on information included in the first body field of the emergency message at step S33020.

If the emergency message does not need to be additionally transmitted, the eNB sends the emergency message to a determined destination through the service bearer described with reference to FIG. 25 at step S33030.

However, if an emergency situation checked through the emergency message needs to be additionally transmitted to an adjacent UE or eNB, the eNB sends the emergency message to a determined destination and generates additional emergency message for additionally transmission which are configured using the first body field and second body field of the emergency message as shown in FIG. 34, at step S33040.

After reconfiguring the emergency message, the eNB notifies UEs in the connection state and the idle state within its coverage that the additional emergency message is present through a paging message. In this case, the transmission scheduling of the additional emergency message may be transmitted to unspecified UEs through system information.

Thereafter, the eNB sends the additional emergency message to an adjacent eNB and/or UE at step S33050.

Additional damage can be prevented because an adjacent eNB or UE can be rapidly notified of an emergency situation or secondary damage which may additionally occur due to the emergency situation through such a method.

FIG. 35 is a flowchart illustrating an example of a method of generating an interface between network nodes to which an embodiment of the present invention may be applied.

Referring to FIG. 35, a network node configures a service bearer for sending the emergency message described with reference to FIG. 25 between an eNB and gateways. The emergency message may be delivered to gateways (e.g., an S-GW and a P-GW) through the service bearer managed by each access network node (e.g., an eNB).

More specifically, the eNB additionally requests the configuration of the service bearer described with reference to FIG. 25 in a process for establishing an S1 interface from an MME(also referred to herein as a "first network node") at step S35010. The configuration request message may include an NDB indicator indicating whether the eNB supports an NDB and a message type field indicative of the type of message which may be transmitted through an NDB.

After receiving the configuration request message from the eNB, the MME sends a session setup request message for requesting the configuration of the service bearer to the S-GW at step S35020. The S-GW sends the session setup request message to the P-GW at step S35030.

Thereafter, when the service bearer is configured, the P-GW sends a session setup response message to the S-GW at step S35040. The S-GW sends the session setup response message to the MME at step S35050.

After receiving the session setup response message providing notification that the service bearer has been configured from the S-GW, the MME notifies the eNB that the service bearer has been configured by sending a configuration response message to the eNB at step S35060.

The configuration response message may include a service bearer ID indicative of the service bearer, QoS indicative of message characteristics, an address which is used to send the emergency message to a destination, a GW address indicative of the address of a gateway to which the emergency message will be sent, and a TEID indicative of a tunnel ID.

If the MME is able to be aware that the eNB supports an NDB, although the MME does not receive an NDB indicator indicating whether the eNB supports an NDB and a message type field indicative of the type of message which may be transmitted through the NDB at step S35010, the MME may configure the service bearer and send the configuration response message, including a result of the configured service bearer, to the eNB. Furthermore, the configuration response message may further include a message type field indicative of the type of message which may be transmitted through the NDB.

In the present embodiment and an embodiment of the present invention, the MME may be represented as a first network node, and the S-GW and the P-GW may be represented as a second network node. The first network node may be responsible for a network control function, and the second network node may be responsible for a data transmission function.

FIG. 36 is a flowchart illustrating an example of a method of changing the environment configuration of an interface between network nodes to which an embodiment of the present invention may be applied.

Referring to FIG. 36, a network node may generate, add, modify, and/or delete a service bearer through the environment configuration update process of the network node.

More specifically, if the environment configuration of a network node is changed (e.g., NDB support is changed to NDB non-support), an eNB sends an environment configuration update request message for requesting the modification or update of the environment configuration to an MME at step S36010.

The environment configuration update request message may include an NDB indicator indicating whether the eNB supports an NDB and a message type field indicative of the type of message which may be transmitted through an NDB.

After receiving the environment configuration update request message from the eNB, the MME sends a configuration request message for a service bearer to an S-GW at step S36020. The S-GW sends the configuration request message to a P-GW at step S36030.

Thereafter, the P-GW sends a session setup response message to the S-GW at step S36040. The S-GW sends the session setup response message to the MME at step S36050.

After receiving the session setup response message providing notification that the service bearer has been generated from the S-GW, the MME notifies the eNB that the service bearer has been generated by sending an environment configuration update response message to the eNB at step S36060.

The environment configuration update response message may include a service bearer ID indicative of the service bearer, QoS indicative of message characteristics, an address which is used to send an emergency message to a destination, a GW address indicative of the address of a gateway to which the emergency message will be transmitted, a message type field indicative of the type of message which may be transmitted through the service bearer, and a TEID indicative of a tunnel ID.

The present embodiment may be used as a procedure for changing and deleting the environment configuration of a service bearer that has already been generated in addition to the initial generation of a service bearer. Furthermore, the present embodiment may also be applied to the generation of an additional service bearer.

In the present embodiment, step S36010 may not be performed. That is, if the environment configuration of a network node is changed, although there is no request from the eNB, the MME may send a session setup/modification/deletion request message to the S-GW.

FIG. 37 is a flowchart illustrating an example of an RRC connection procedure for configuring a bearer for sending an emergency message to which an embodiment of the present invention may be applied.

After UE and an eNB perform the aforementioned random access procedure, the UE may send an RRC connection request message to the eNB in order to perform RRC connection with the eNB at step S37010.

The RRC connection request message may include a cause field indicative of a reason why the RRC connection request is transmitted and/or an NDB indicator, that is, an indicator indicating whether the UE supports an NDB, as described above with reference to FIG. 26.

Thereafter, the UE receives an RRC connection setup message, including configuration information for an NDB configuration, from the eNB as a response to the RRC connection request message at step S37020.

When the UE receives the configuration information, an NDB is configured between the eNB and the UE. Thereafter, the UE receives uplink resources for sending an emergency message from the eNB at step S37030.

The UE may receive the NDB configuration and the allocated resources for sending the emergency message through such a method and send the emergency message to the eNB through the allocated resources S37040.

FIG. 38 is a flowchart illustrating an example of a method of sensing an emergency message in the idle state to which an embodiment of the present invention may be applied.

Referring to FIG. 38, UE may send an emergency message prior to the authentication (i.e., effectiveness verification) of the UE in the idle state.

More specifically, an eNB may periodically broadcast system information to UEs within its coverage at step S38010. In this case, the system information may include bearer support information indicating whether an NDB is supported and a message type field indicative of the type of emergency message which may be transmitted through the NDB and/or the service bearer described with reference to FIG. 25.

Thereafter, when an emergency message is generated, the UE in the idle state performs the aforementioned random access procedure along with the eNB at step S38020. That is, the UE sends a random access preamble to the eNB and receives a random access response message from the eNB. In this case, the random access procedure may be separately designed for the UE which tries to send the emergency message in the idle state.

More specifically, downlink scheduling information about the random access response message may be CRC-masked with a random access-radio network temporary identifier (RA-RNTI) and transmitted through an L1 or L2 control channel (PDCCH). The UE which has received a downlink scheduling signal masked with the RA-RNTI may receive the random access response message through a physical downlink shared channel (PDSCH) and decode the received random access response message. Thereafter, the UE checks whether random access response information indicated for the UE is included in the random access response message. Whether the random access response information indicated for the UE is included in the random access response message may be checked based on whether the random access preamble ID (RAID) of a preamble transmitted by the UE is present.

The random access response information includes timing alignment (TA) indicative of timing offset information for synchronization, radio source allocation information used in uplink, and a temporary identifier (e.g., a temporary C-RNTI) for identifying UE.

The UE provides notification that the emergency message has occurred through resources allocated in this process. In order to request the transmission of the emergency message in the idle state, the UE may send a request message (or, an RRC direct data transfer request message) to the eNB at step S38030.

The request message may include a message type field indicative of the type of emergency message, an NDB indicator indicating whether the emergency message is a message transmitted without the configuration of an EPS bearer, that is, a message that needs to be transmitted to a gateway through the service bearer, and a size field indicative of the size of the emergency message.

The eNB may be aware whether an emergency message to be transmitted through uplink is present, whether the emergency message needs to be transmitted through the service bearer, and of the type and size of the emergency message through the request message.

The eNB may determine the size of resource allocation based on the size of the emergency message and sends a response message (or an RRC direct data transfer response message), including an UL resource IE indicative of information about the allocated uplink resources, to the UE at step 538040.

The response message may be included in an RRC message, an MAC message or in the form of an MAC header and transmitted.

The UE sends the emergency message through the uplink resources allocated by the eNB at step S38050. If the NDB indicator is not transmitted at step S38030, the NDB indicator, together with the emergency message, may be transmitted to the eNB.

Thereafter, the eNB sends the emergency message, the NDB indicator, and the message type field to an MME through the service bearer based on the message type at step S38060.

The MME determines whether the UE is effective. If the UE is not effective, the MME does not send the emergency message to a gateway and sends a message indicative of the transfer failure of the emergency message to the eNB.

If the UE is effective, however, the MME may determine a gateway to which the emergency message will be transmitted and the service bearer based on the NDB indicator, the message type field, and information about the eNB which have been received from the eNB, as described above with reference to FIG. 25. The MME sends the emergency message to the determined gateway through the service bearer and sends a message indicating that the UE is effective and that the emergency message has been successfully transmitted to the UE.

Thereafter, if the emergency message needs to be additionally transmitted, that is, if whether additional damage may occur is present, the eNB reconfigures the emergency message as described above with reference to FIG. 34 and sends the reconfigured emergency message to an adjacent eNB and adjacent UE.

In this case, if only the third body field of the emergency message has been encrypted, the eNB may receive a message indicating that the UE is effective and that the emergency message has been successfully transmitted from the MME and may send the reconfigured emergency message to adjacent UE and an adjacent eNB.

In contrast, if the entire emergency message has been encrypted, the MME sends the first body field and second body field of a decoded emergency message to the eNB. The eNB sends an additional emergency message, reconfigured using the first body field and the second body field as described above with reference to FIG. 34, to adjacent UE and an adjacent eNB.

FIG. 39 is a flowchart illustrating another example of a method of sensing an emergency message in the idle state to which an embodiment of the present invention may be applied.

Referring to FIG. 39, UE may send an emergency message after the authentication (i.e., effectiveness verification) of the UE in the idle state.

First, step S39010 to step S39030 are the same as step S38010 to step S38030 of FIG. 38, and thus a description thereof is omitted.

Thereafter, an eNB may send a transmission request message (or UE data transmission request message (or UE data transfer request message)) for requesting the transmission of the emergency message to an MME at step S39040. In this case, an S1 application protocol may be used between the eNB and the MME.

The MME may determine whether the UE is effective (integrity) and determine whether to send the emergency message to a gateway based on a result of the determination.

If the UE is not effective, the MME sends a transmission response message (or UE data transmission response message (or UE data transfer response message)), including authentication information indicating that the UE is not effective, to the eNB at step S39050.

If the UE is effective, however, the MME sends a transmission response message (or UE data transmission response message (or UE data transfer response message)), including authentication information indicating that the UE is effective and security-related information, to the eNB at step S39050.

If the UE is effective, the eNB may determine the size of resource allocation based on the size of the emergency message and sends a response message (or RRC direct data transfer response message (RRC direct data transfer response message)), including an UL resource IE indicative of information about the allocated uplink resources, to the UE at step S39060.

The response message may be included in an RRC message, an MAC message, or in the form of an MAC header and transmitted.

Thereafter, the UE sends the emergency message to the eNB through the uplink resources allocated by the eNB at step S39070.

The eNB may determine a gateway to which the emergency message needs to be transmitted and the service bearer as described above with reference to FIG. 25 through the NDB indicator and the message type field and may send the emergency message to the determined gateway at step S39080.

Thereafter, if the emergency message needs to be additionally transmitted, that is, if whether additional damage may occur is present, the eNB reconfigures the emergency message as described above with reference to FIG. 34 and sends the reconfigured emergency message to adjacent UE and an adjacent eNB.

FIG. 40 is a flowchart illustrating another example of a method of sensing an emergency message in the idle state to which an embodiment of the present invention may be applied.

Referring to FIG. 40, UE in the idle state is authenticated (i.e., subjected to effectiveness verification) by an eNB. After the authentication, the UE may send an emergency message.

First, step S40010 to step S40030 are the same as step S38010 to step S38030 of FIG. 38, and thus a description thereof is omitted.

Thereafter, the eNB performs authentication (effectiveness verification) on the UE. If the UE is not effective, the eNB sends a response message (or RRC direct data transfer response message (or RRC direct data transfer response message)), including authentication information indicating that the UE is not effective, to the UE at step S40040.

If the UE is effective, however, the eNB may determine the size of resource allocation based on the size of the emergency message and sends a response message (or RRC direct data transfer response message (or RRC direct data transfer response message)), including an UL resource IE indicative of information about allocated uplink resources, to the UE at step S40040.

The response message may be included in an RRC message, an MAC message, or in the form of an MAC header and transmitted.

Thereafter, the UE sends the emergency message to the eNB through the uplink resources allocated by the eNB at step S40050. In this case, if an NDB indicator is not transmitted at step S40030, the NDB indicator, together with the emergency message, may be transmitted to the eNB.

The eNB may determine a gateway to which the emergency message needs to be transmitted and a service bearer as described above with reference to FIG. 25 through the NDB indicator and the message type field and may send the emergency message to the determined gateway at step S40060.

Thereafter, if the emergency message needs to be additionally transmitted, that is, whether additional damage may occur is present, the eNB reconfigures the emergency message as described above with reference to FIG. 34 and sends the reconfigured emergency message to adjacent UE and an adjacent eNB.

FIG. 41 is a flowchart illustrating another example of a method of sensing an emergency message in the idle state to which an embodiment of the present invention may be applied.

Referring to FIG. 41, UE may send an emergency message to an eNB through resources allocated through a random access procedure. The eNB may determine whether the UE is effective and then send the emergency message to a gateway.

First, step S41010 and step S41020 are the same as step S38010 and step S38020 of FIG. 38, and thus a description thereof is omitted.

Thereafter, the UE sends the emergency message and an NDB indicator through uplink resources, allocated through the random access procedure, to the eNB at step S41030.

The eNB performs authentication (i.e., effectiveness verification) on the UE. If, as a result of the authentication, the UE is found to be not effective, the eNB may not send the emergency message to the gateway.

If, as a result of the authentication, however, the UE is found to be effective, the eNB may determine the gateway to which the emergency message needs to be transmitted as described above with reference to FIG. 25 through the NDB indicator and a message type field and may send the emergency message to the determined gateway at step S41040.

FIG. 42 is a diagram showing an example of the internal block diagram of a wireless apparatus to which an embodiment of the present invention may be applied.

In this case, the wireless apparatus may be an eNB and UE. The eNB includes both a macro eNB and a small eNB.

As shown in FIG. 42, the eNB 42110 and the UE 42120 include respective communication units (transceiver units or RF units 42113 and 42123), respective processors 42111 and 42121, and pieces of respective memory 42112 and 42122.

The eNB and UE may further include respective input units and output units.

The communication unit 42113, 42123, the processor 42111, 42121, the input unit, the output unit, and the memory 42112, 42122 are functionally connected in order to perform the methods proposed in this specification.

When information generated from a physical layer (PHY) protocol is received, the communication unit (transceiver or the RF unit) 42113, 42123 moves the received information to a radio frequency (RF) spectrum, performs filtering and amplification on the information, and sends the processed information to an antenna. Furthermore, the communication unit functions to move an RF signal received from the antenna to a band which may be processed in the PHY protocol and to perform filtering.

Furthermore, the communication unit may include a switch function for switching such a transmission and reception function.

The processor 42111, 42121 implements the functions, processes and/or methods proposed in this specification. The layers of a radio interface protocol may be implemented by the processor.

The processor may be represented as a control unit, a controller, or a computer.

The memory 42112, 42122 is connected to the processor and stores a protocol or parameter for performing a method of allocating uplink resources.

The processor 42111, 42121 may include application-specific integrated circuits (ASIC), other chipsets, logic circuits and/or data processors. The memory may include read-only memory (ROM), random access memory (RAM), flash memory, a memory card, a storage medium and/or other storage devices. The communication unit may include baseband circuits for processing radio signals. When an embodiment is implemented in software, the aforementioned scheme may be implemented using a module (process or function) for performing the aforementioned function.

The module may be stored in the memory and may be executed by the processor. The memory may be placed inside or outside the processor and connected to the processor through various well-known means.

The output unit (or display unit) is controlled by the processor and outputs information output by the processor along with a key entry signal generated by a key input unit and various information signals from the processor.

While the present invention has been described in connection with what is presently considered to be practical exemplary embodiments, it is to be understood that the present invention is not limited to the disclosed embodiments, but, on the contrary, is intended to cover various modifications and equivalent arrangements included within the scope of the appended claims.

INDUSTRIAL APPLICABILITY

The bearer configuration method in a wireless communication system according to an embodiment of the present invention has been described based on an example in which the bearer configuration method is applied 3GPP LTE/LTE-A systems, but may be applied to various wireless communication systems in addition to 3GPP LTE/LTE-A systems.

The invention claimed is:

1. A method of transmitting and receiving by a base station, data through a dedicated bearer in a wireless communication system, the method comprising:
   establishing (i) a session between network node and the base station and (ii) the dedicated bearer between a user equipment and the base station;
   receiving a specific message related to an emergency service through the dedicated bearer from the user equipment earlier than a reception of a general message related to a service other than the emergency service,
   wherein the dedicated bearer is previously established before an initial occurrence of a specific event related to a reception of the specific message,
   wherein the dedicated bearer is not released after the specific event is finished, and
   wherein the specific message includes message type information indicating a type of the specific message; and
   transmitting the received specific message to the network node through the session based on the message type information.

2. The method of claim 1, further comprising:
   transmitting bearer support information and support message type information to the user equipment,
   wherein the bearer support information indicates whether the dedicated bearer for transmitting and receiving the specific message is supported by the base station, and
   wherein the support message type information includes one or more message types capable of being transmitted through the dedicated bearer.

3. The method of claim 2, wherein the bearer support information and the support message type information are included in system information, and
   wherein the system information is transmitted in a form of a system information block.

4. The method of claim 2 wherein the establishing the session and the dedicated bearer comprises:
   receiving a radio resource control (RRC) connection request message from the user equipment; and
   transmitting an RRC connection setup message including configuration information related to the dedicated bearer in response to the RRC connection request message,
   wherein the RRC connection request message includes a cause field indicating an RRC connection request for transmitting the specific message.

5. The method of claim 4, wherein one of the RRC connection request message or the specific message further includes an indicator indicating whether the dedicated bearer is supported by the user equipment.

6. The method of claim 4, further comprising:
   receiving an uplink resource request message for the specific message from the user equipment; and
   transmitting an uplink resource allocation message to the user equipment in response to the uplink resource request message.

7. The method of claim 6, further comprising:
   receiving a buffer status report (BSR) message,
   wherein the BSR message includes at least one of a logical channel ID (LCID) field or one or more size fields, wherein the LCID field indicates that the BSR message is used for transmitting the specific message, and wherein the one or more size fields indicate a size of the specific message.

8. The method of claim 7, wherein the BSR message further includes a field indicating a number of the one or more size fields.

9. The method of claim 4, wherein the establishing the session and the dedicated bearer comprises:

transmitting a session establishment request message for the establishment of the session to a Mobility Management Entity(MME); and receiving a session establishment response message from the MME in response to the session establishment request message, wherein the session establishment request message includes at least one of bearer support information, support message type information, a quality-of-service (QoS) information of the specific message, destination information, or network node address information indicating an address of the network node to which the specific message is transmitted.

10. The method of claim 1, wherein the dedicated bearer and the session are established according to a plurality of types of services supported by the base station.

11. The method of claim 1, wherein the receiving the specific message comprises:

receiving a request message for requesting a transmission of the specific message from the user equipment;

transmitting a response message including resource information for transmitting the specific message in response to the request message; and receiving the specific message from the user equipment based on the resource information.

12. The method of claim 11, wherein the request message includes at least one of an indicator or the message type information, and wherein the indicator indicates whether the dedicated bearer is supported by the user equipment.

13. The method of claim 1, wherein the specific message includes at least one of a first body field, a second body field, a third body field, or a length field indicating a length of each body field.

14. The method of claim 13, wherein the first body field includes at least one of the message type information, destination information indicating a destination to which the specific message is transmitted, or additional transmission information indicating whether the specific message needs to be transmitted to other user equipments and other base stations, wherein the second body field includes at least one of location information or address information related to a location where a specific situation has occurred, and wherein the third body field includes at least one of a telephone number of the user equipment or image information about the specific situation.

15. The method of claim 14, further comprising:

transmitting the specific message to the destination; and transmitting the specific message to the other user equipments and the other base stations, responsive to the additional transmission information indicating that specific message needs to be transmitted to the other user equipments and the other base stations.

16. The method of claim 1, wherein the specific message is not managed in a form of logical channel group, wherein the general message is managed in the form of the logical channel group, wherein the specific message is processed by a separate buffer of the base station, wherein the separate buffer processes only the specific message, and wherein a state of the separate buffer is reported to the base station separately from states of a buffer processing the general message.

17. A base station for transmitting and receiving data through a dedicated bearer in a wireless communication system, the base station comprising:

a transceiver configured to transmit and receive radio signals to and from an external communication device; and a processor functionally coupled to the transceiver, wherein the processor is configured to:

establish (i) a session between a network node and the base station and (ii) the dedicated bearer between a user equipment and the base station;

receive a specific message related to an emergency service through the dedicated bearer from the user equipment earlier than a reception of a general message related to a service other than the emergency service, wherein the dedicated bearer is previously established before an initial occurrence of a specific event related to a reception of the specific message, wherein the dedicated bearer is not released after the specific event is finished, and wherein the specific message includes message type information indicating a type of the specific message; and transmit the received specific message to the network node through the session based on the message type information.

18. A wireless communication system for transmitting and receiving data through a dedicated bearer, the wireless communication system comprising a base station, a user equipment, a first network node and a second network node, the base station, the user equipment, the first network node and the second network node being operable to:

transmit, by the base station, an establishment request message to the first network node for requesting establishment of a session configured for the base station between the second network node and the base station;

transmit, by the first network node, an establishment response message to the base station in response to the establishment request message;

transmit, by the base station, bearer support information and support message type information to the user equipment, wherein the bearer support information indicates whether a dedicated bearer for transmitting and receiving a specific message related to an emergency service is supported by the base station, and wherein the support message type information indicates a message type capable of being transmitted through the dedicated bearer;

transmit, by the user equipment, the specific message through the dedicated bearer to the base station earlier than a transmission to the base station of a general message related to a service other than the emergency service, wherein the dedicated bearer is previously established before an initial occurrence of a specific event related to a reception of the specific message, wherein the dedicated bearer is not released after the specific event is finished, and wherein the specific message includes message type information indicating a type of the specific message; and transmit, by the base station, the received specific message to the second network node through the session based on the message type information,
wherein the establishment request message includes at least one of the session support information or the support message type information.

\* \* \* \* \*